US008132823B2

(12) United States Patent
Balcom et al.

(10) Patent No.: US 8,132,823 B2
(45) Date of Patent: Mar. 13, 2012

(54) RECONFIGURABLE TILT WHEELCHAIR

(75) Inventors: Nancy Balcom, Vancouver (CA); Louis Belanger, Victoria (CA); Torr Brown, North Vancouver (CA); Janusz Krawczynski, Delta (CA); Phil Mundy, Vancouver (CA); David Harding, Toronto (CA); David Cheng Cheng, Delta (CA)

(73) Assignee: PDG Product Design Group Inc., Vancouver, British Columbia (CA)

( * ) Notice: Subject to any disclaimer, the term of this patent is extended or adjusted under 35 U.S.C. 154(b) by 0 days.

(21) Appl. No.: 12/957,213

(22) Filed: Nov. 30, 2010

(65) Prior Publication Data

US 2011/0068553 A1 Mar. 24, 2011

Related U.S. Application Data

(62) Division of application No. 11/838,492, filed on Aug. 14, 2007, now Pat. No. 7,871,094.

(51) Int. Cl.
*B62M 1/14* (2006.01)

(52) U.S. Cl. .................................. 280/250.1; 280/304.1

(58) Field of Classification Search ............... 280/250.1, 280/304.1

See application file for complete search history.

(56) References Cited

U.S. PATENT DOCUMENTS 5,292,144 A 3/1994 Sosnoff
5,513,867 A 5/1996 Bloswick et al.
6,032,976 A 3/2000 Dickie et al.
6,217,114 B1 4/2001 Degonda
6,296,265 B1 10/2001 Lovins
6,338,496 B1 1/2002 O'Neill, Sr.
6,394,476 B1 5/2002 Molnar
6,409,265 B1 6/2002 Koerlin et al.
6,447,064 B1 9/2002 Mundy et al.
6,976,699 B2 12/2005 Koerlin
6,979,010 B1 12/2005 Kwapis
7,007,965 B2 3/2006 Bernatsky et al.
7,871,094 B2 * 1/2011 Balcom et al. ............. 280/250.1
2002/0180176 A1 12/2002 Post et al.
2003/0230868 A1 12/2003 Beumer
2004/0046358 A1 3/2004 White et al.
2006/0113746 A1 6/2006 Bright et al.
2007/0029857 A1 2/2007 Hanson et al.
2007/0278761 A1 12/2007 Firth
2009/0146389 A1 6/2009 Borisoff

OTHER PUBLICATIONS

Reed, Matthew P. (Ph.D.), "Whole-Body Center of Mass Location in Seated Postures," May 28, 2006, 6 pages, University of Michigan Transportation Research Institute.

* cited by examiner

*Primary Examiner* — Kevin Hurley
*Assistant Examiner* — Marc Scharich
(74) *Attorney, Agent, or Firm* — Michael A. Glenn; Glenn Patent Group

(57) ABSTRACT

A modular wheelchair assembly is adapted to be reconfigured between a fixed angle of tilt, a dynamically adjustable tilt-in-space configuration with the tilt axis being near the user's knees and a dynamically adjustable tilt-in-space configuration with the tilt axis being near the user's center of gravity. The reconfiguration is achieved by modifying a limited number of selectively removable components of the support assembly or the pivot assembly of the wheelchair.

1 Claim, 34 Drawing Sheets

RECONFIGURABLE TILT WHEELCHAIR

CROSS REFERENCE TO RELATED APPLICATIONS

This application is a divisional of U.S. patent application Ser. No. 11/838,492 filed Aug. 14, 2007 now U.S. Pat. No. 7,871,094, all of which is incorporated herein in its entirety by this reference thereto.

FIELD OF THE INVENTION

This invention relates to wheelchairs. More particularly, the invention relates to a modular wheelchair assembly that is configurable to different tilt configurations and to features thereof.

BACKGROUND OF THE INVENTION

The designs of most wheelchairs are optimized to accommodate a particular level of disability. Persons with low disability tend to use relatively inexpensive wheelchairs that have no seat tilt or a fixed seat tilt and a footrest assembly that easily accommodates self-propulsion using the occupant's feet.

Persons with moderate disability may prefer a wheelchair that allows for optional self-propulsion but that can be tilted to offer a range of seating angles. Tilting the seat provides pressure relief to the occupant, reduces discomfort associated with sitting for long periods of time, and provides passive correction for deformities. The ability to self propel using the feet may be preserved despite various tilt angles by providing the axis of rotation near the front of the seat such that the distance from the knees to the ground remains relatively constant. A disadvantage of such a configuration is the force required in order to move the weight of the occupant about the axis of rotation. This is sometimes compensated for by a pneumatic assist mechanism extending between the base of the chair and the seat frame as described in commonly owned U.S. Pat. No. 6,447,064.

High disability individuals typically require a wheelchair with deeper tilt angles to improve trunk stability and head control. Some such wheelchairs also use mechanical actuators to accommodate the significant force sometimes required to move the weight of the occupant through deep tilt angles. It is also known in the prior art to minimize the effort required to tilt the occupant by providing a pivot point as close as possible to his center of gravity. U.S. Pat. No. 7,007,965 provides an example of such a system.

While various tilt configurations may be suited to particular types or levels of disability, many individuals suffer from disabilities that progress over time. Over the course of such a disability, the occupant may graduate through 3-4 different types of wheelchairs, each having different attributes. For example, a no-tilt or fixed tilt wheelchair may be used at the early onset of disability, a self-propellable tilting wheelchair can be used when the disability becomes moderate, and a deep tilt wheelchair can be used in the later stages of disability.

The present invention addresses the need for a reconfigurable modular wheelchair that is capable of being selectively configured in a fixed tilt configuration, a dynamic tilt-in-space configuration with the axis of rotation near the occupant's knees, or a dynamic tilt-in-space configuration with the axis of rotation near the occupant's center of gravity, as required to accommodate the evolving needs of the occupant.

SUMMARY OF THE INVENTION

The wheelchair according to the invention comprises a base frame, a seat frame, and interchangeable interface components adapted to assemble the base frame and seat frame to one another according to either a fixed tilt configuration, a dynamic tilt-in-space configuration with the axis of rotation near the front of the seat, or a dynamic tilt-in-space configuration with the axis of rotation near the center of gravity of the occupant.

In a first configuration, the wheelchair comprises a base frame assembly pivotally connected to a seat frame assembly about cooperating pivot elements at a pivot point located near the knees of the occupant. A support assembly extends between a base crossbar assembly and a seat crossbar assembly. The support assembly comprises a bracket removably attached to one of such crossbar assemblies, and an interface element attached between the brace and the other one of such crossbar assemblies. The interface element includes a plurality of attachment points arrayed to share a constant radius in relation to the pivot point. The selection of the attachment point allows the base frame and the seat frame assemblies to be assembled at a variety of fixed tilt angles to thereby provide adjustable static positioning for the user requiring minimal support and correction.

In a second configuration, the wheelchair again provides a pivot point near the knees of the occupant through cooperating pivot elements on the base frame and seat frame assemblies. A support assembly extending between the base crossbar assembly and the seat crossbar assembly comprises a bracket and a bias mechanism such as a gas strut to enable the occupant to be lifted from a low tilt angle more easily than would be the case without the mechanism. In one aspect, the pneumatic mechanism includes a bell crank arrangement to converts the longitudinal force from the gas strut to an upward force to lift the seat frame and to modulate the degree of resistance provided at different tilt angles as the centre of gravity of the occupant moves forward or backward and to translate.

In a third configuration, the chair may be tilted about an axis that approximately coincides with the centre of gravity of the occupant. The tilting is provided by suspending the seat frame from an axis of rotation supported on the base frame. This configuration has the advantage of making it very easy to tilt the wheelchair and obviates the need for pneumatic mechanisms or actuators.

The invention is also directed to a drive wheel system wherein the wheel lock assembly and the anti-tip assembly are connected to the axle mounting plate such that the change of drive wheel position on the base frame does not require consequent adjustment of the lock and anti-tip assemblies.

In yet a further aspect, the invention is directed to a telescoping crossbar assembly comprising an outer sleeve having a base with a non-straight cross-section, a hollow inner shaft having a base with a cross-section conforming to said non-straight cross-section, and a pair of aligned fastener holes in said outer sleeve, one of said fastener holes having a larger diameter than the other.

In yet a further aspect, the invention is directed to a mounting assembly for securing fasteners to an elongated hollow member such as a side tube of a wheelchair. The hollow member has a plurality of fastener apertures extending longitudinally of the hollow member. An elongated insertion member is adapted to be longitudinally inserted and retained in the hollow member. A plurality of nuts are retained in several seats provided along the length of the insertion member such that when it is inserted and retained in the hollow member with the nuts aligned to the fastener apertures, fasteners inserted into the apertures will engage the nuts and be retained without the need to traverse the opposing wall of the hollow member.

In a further aspect, the wheelchair has a seat frame assembly comprising opposed seat rails and at least one seat crossbar assembly extending between them. A base frame assembly comprises opposed base rails and at least one base crossbar assembly extending between the base rails. A forward portion of the seat frame assembly and a forward portion of the base frame assembly is adapted to receive opposed removable pivot assemblies to pivot the seat frame assembly in relation to the base frame assembly. The seat and base crossbar assemblies are adapted to removably receive a support assembly extending between them. A forward portion of each of the seat rails is adapted to selectively attach a pivot member thereto and a rearward portion of each of the base rails is adapted to receive a removable pivot arm thereon enabling reconfiguration of the wheelchair between a pivot point near the user's knees and a center of gravity pivot point.

In another aspect, a fixed tilt wheelchair comprises a seat frame assembly and a base frame assembly. A first pivot element is removably attached to a forward portion of the seat frame assembly. A second pivot element is removably attached to a forward portion of the base frame assembly and the first and second removable pivot elements, when installed, cooperate to define a pivot point between them. A removable support assembly is connected between the seat frame assembly and the base frame assembly, the support assembly being configurable to define any one of a plurality of predetermined relative pivot angles between the seat frame and base frame assemblies.

Another aspect of the invention relates to a mounting assembly for an elongated hollow member. An elongated hollow member has a plurality of fastener apertures extending transversely of the hollow member. An elongated insertion member is adapted to be longitudinally inserted and retained in the elongated hollow member, the insertion member having a plurality of seats for retaining nuts therein. A plurality of nuts are seated in the seats and the insertion member is inserted into the hollow member to align said nuts with the fastener apertures.

In another aspect a dynamically tiltable wheelchair comprises a seat frame assembly, a base frame assembly, a first pivot element removably attached to a forward portion of the seat frame assembly and a second pivot element removably attached to a forward portion of the base frame assembly. The first and second removable pivot elements, when installed, cooperate to define a pivot point between them, said first and second pivot elements being operatively secured to one another. A removable support assembly is connected between the seat frame assembly and the base frame assembly, the support assembly comprising bias means between the seat frame assembly and the base frame assembly.

In another aspect the bias means comprises an extendible element one end of which is pivotally secured to a bell crank, and said bell crank is retained in operative relationship to said base frame assembly.

In another aspect, a dynamically tiltable wheelchair comprises a seat frame assembly having opposed seat rails and a base frame assembly having opposed base rails. A pivot arm is removably secured to a rearward portion of each of the base rails, said pivot arm extending upwards above said seat frame assembly. A hanger member is removably secured to a rearward portion of each of the seat rails and extends upwardly. The pivot arm and the hanger member cooperate to define a pivot point near the expected center of gravity of a wheelchair occupant for pivoting the seat frame assembly in relation to the base frame assembly.

In a method aspect of the invention, the wheelchair may be reconfigured from a fixed tilt configuration to a dynamically tiltable configuration. By removing from the fixed tilt configuration an element that renders a removable support assembly configurable to any one of a plurality of predetermined relative pivot angles between the seat frame and the base frame. A biasing mechanism is also installed that provides a mechanical advantage in tilting the seat frame in relation to the base frame.

In another method aspect, the wheelchair is reconfigurable from a first dynamically tillable configuration where the pivot axis is near the front of the wheelchair to a second dynamically tiltable configuration where the tilt axis is near the expected center of gravity of an occupant. The first dynamically tiltable configuration comprises a seat frame, a base frame, a removable forward pivot assembly pivotally attaching the forward portion of the seat frame to the forward portion of the base frame and a removable support assembly connected between the seat frame and the base frame, the support assembly comprising a biasing mechanism that provides a mechanical advantage in tilting the seat frame in relation to the base frame. The reconfiguration is accomplished by disengaging the forward pivot assembly and installing a center of gravity pivot assembly comprising a pivot point near the expected center of gravity of a seated occupant.

In another aspect, the invention comprises a kit for a reconfigurable wheelchair system comprising a seat frame assembly, a base frame assembly and a plurality of alternative support assemblies for supporting the seat frame assembly on the base frame assembly.

In an aspect of the invention relating to the crossbar assembly, there is provided a telescoping crossbar assembly for rigidly extending between structural elements at selectable degrees of extension comprising a hollow outer tube, an inner tube slidably receivable in the outer tube, the inner tube and the outer tube having generally corresponding cross-sectional shapes. A plurality of fasteners extend through the outer tube and the inner tube, each of the fasteners having a body portion and a head portion larger than the body portion, and wherein the head portion bears on the inner tube through an aperture in the outer tube.

In yet another aspect, the invention is a drive wheel assembly for a wheelchair comprising a mounting element adapted to be adjustably secured to a component of a base frame in one of a plurality of alternative positions. A wheel mountable on the mounting element and a rod having a wheel lock assembly mounted thereon is attached to the mounting element. Adjustment of the mounting element in relation to the base frame maintains the position of the wheel lock assembly in relation to the wheel without requiring separate adjustment thereof.

In a further aspect of the invention, there is provided a crossbar mounting system for the crossbar between opposed rails. The crossbar has a substantially hollow tube having opposed apertures therein and the rail has at least one aperture extending therethrough. An insert is adapted to be inserted through said opposed apertures, said insert having at least one aperture adapted to receive a fastener extending through said aperture and said rail for securing said crossbar to the rail.

The foregoing was intended as a broad summary only and of only some of the aspects of the invention. It was not intended to define the limits or requirements of the invention.

Other aspects of the invention will be appreciated by reference to the detailed description of the preferred embodiment and to the claims.

BRIEF DESCRIPTION OF THE DRAWINGS

The preferred embodiment of the invention will be described by reference to the drawings thereof in which.

DETAILED DESCRIPTION OF THE PREFERRED EMBODIMENTS

Figure 1:
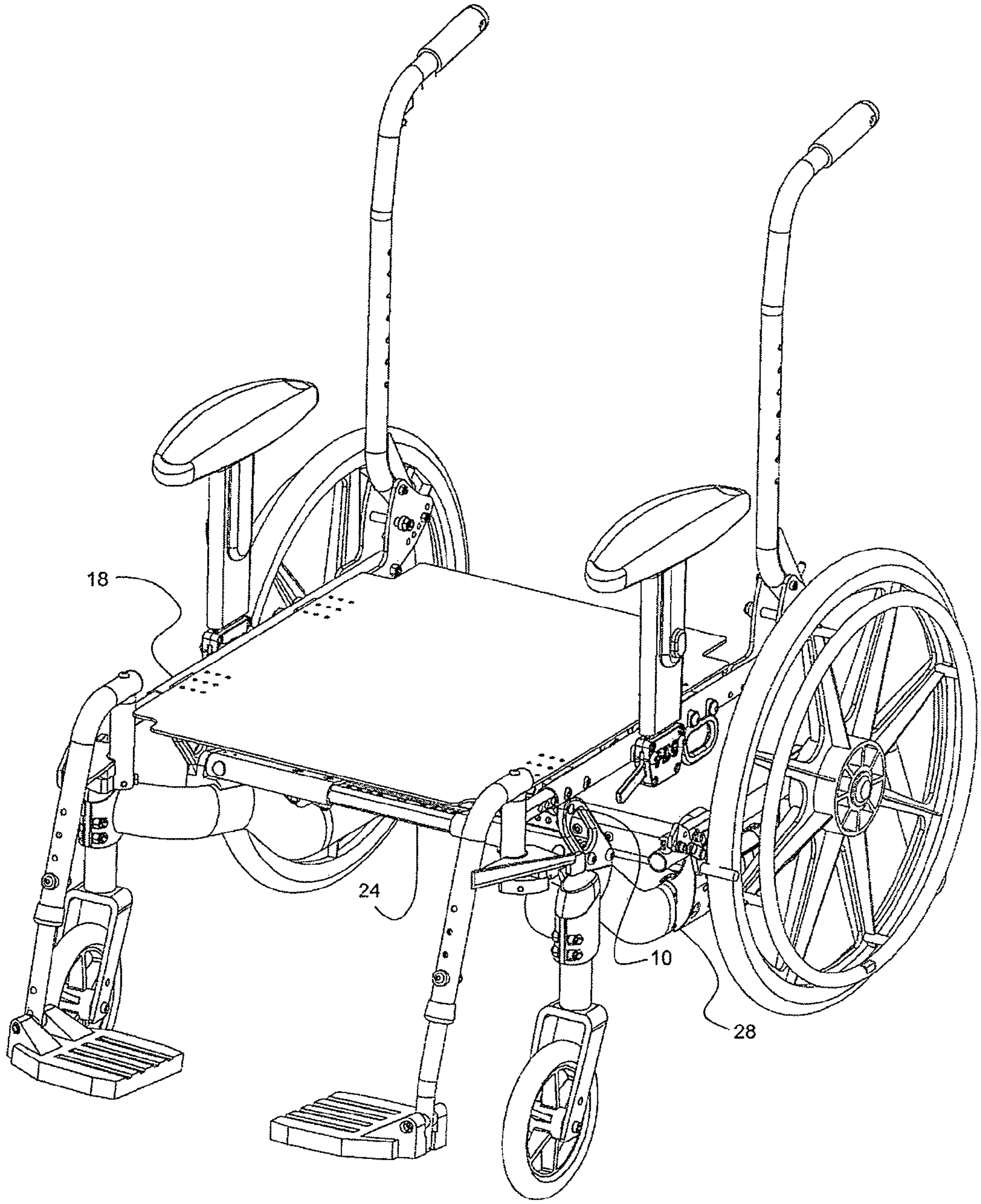
FIG. 1 is a front perspective view of the TF configuration of the wheelchair of the preferred embodiment.
Figure 2A:
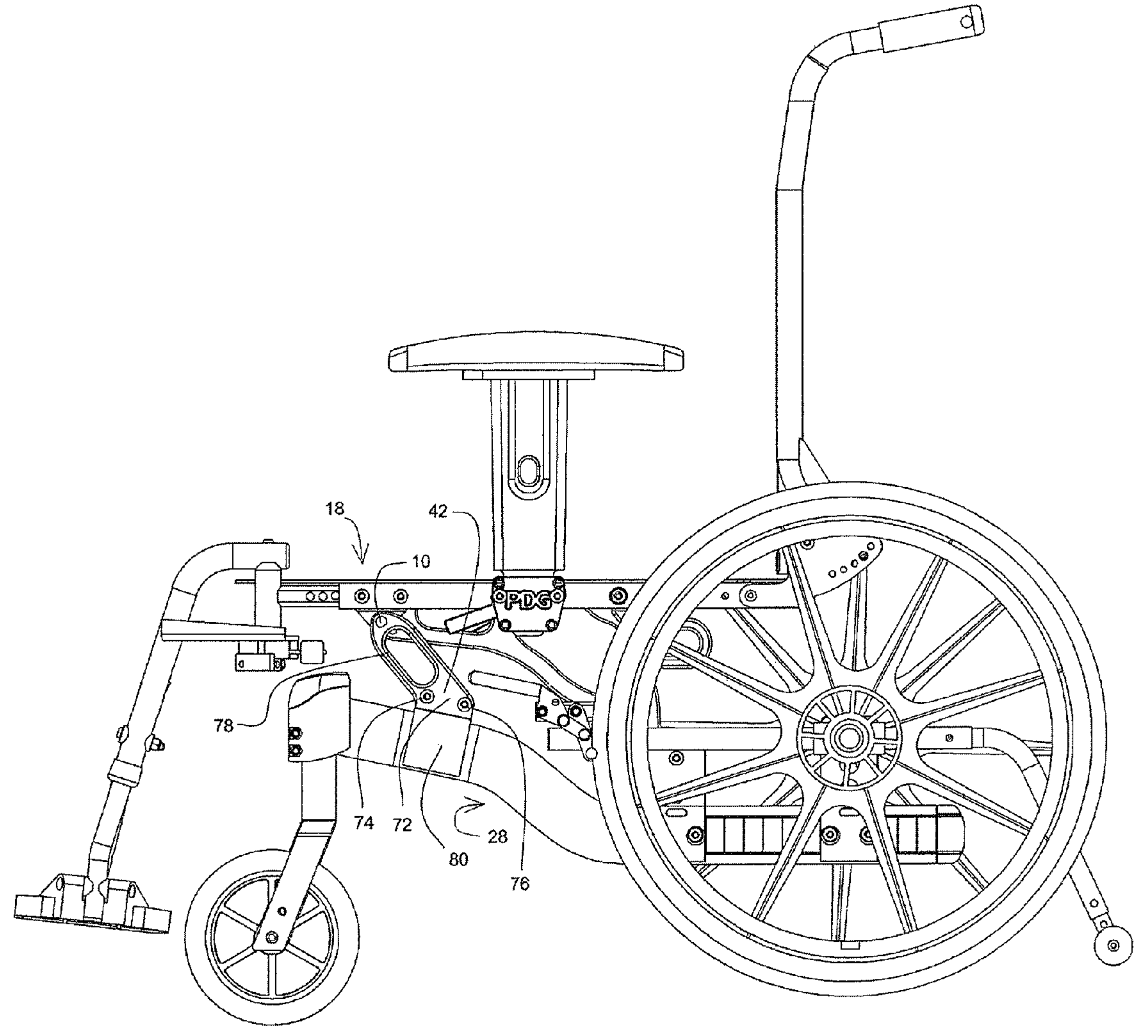
FIG. 2*a* is a side elevation of the TF configuration at a neutral (horizontal) tilt angle.
Figure 2B:
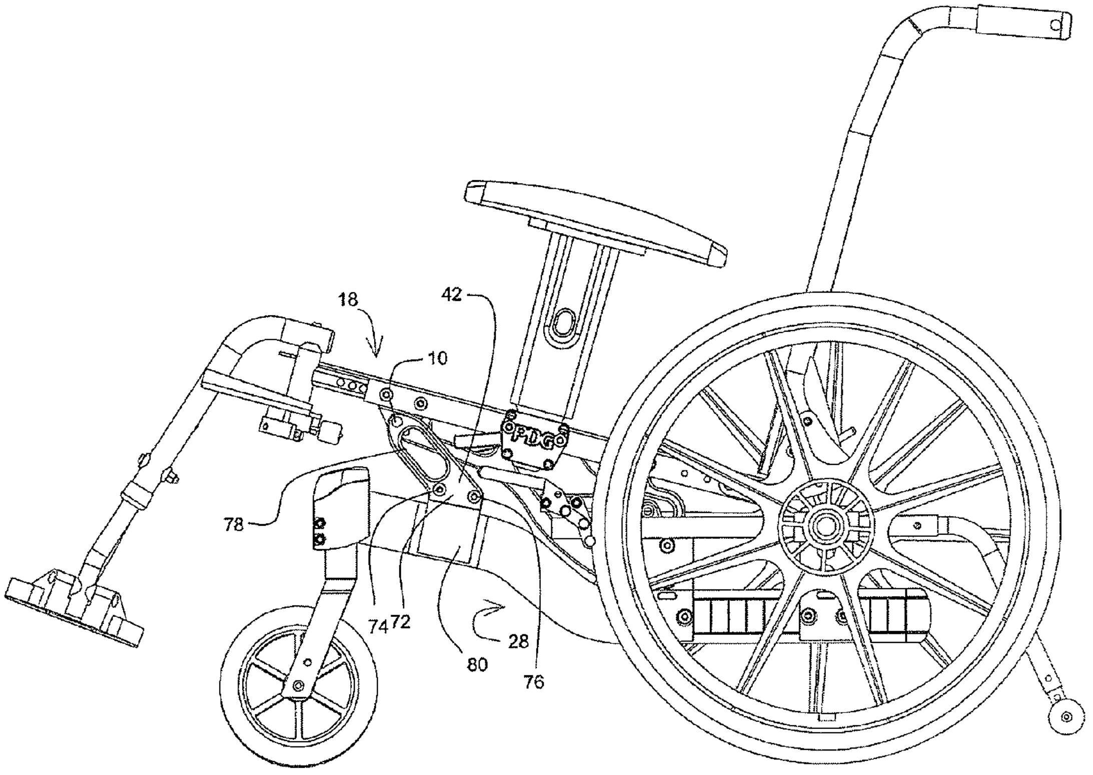
FIG. 2*b* is a side elevation of the TF configuration at a different tilt angle than in FIG. 2*a;*
Figure 3:
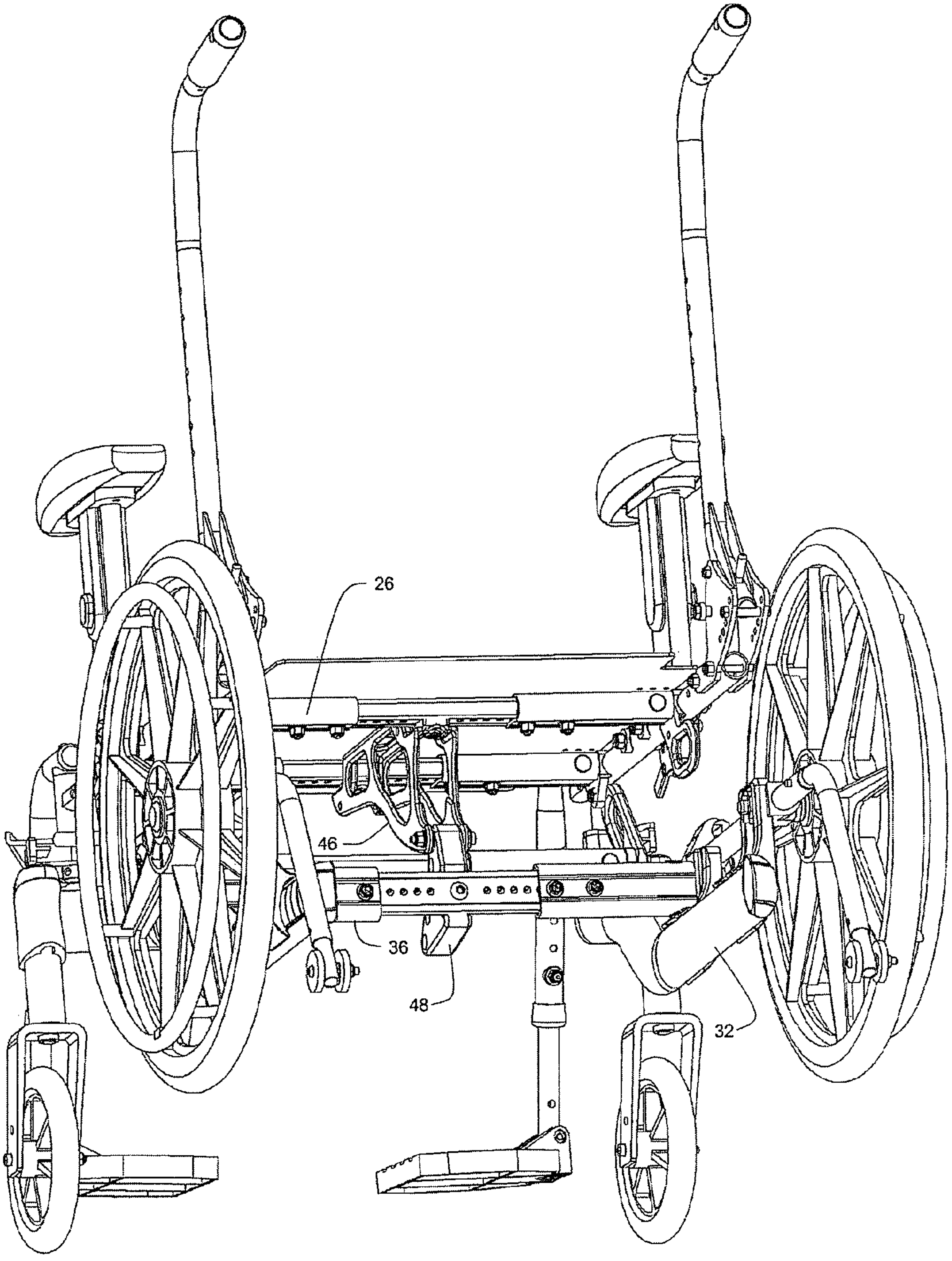
FIG. 3 is a bottom rear perspective view of the TF configuration.

FIGS. 1, 2*a*, 2*b* and 3 illustrate the preferred embodiment of the fixed tilt configuration of the wheelchair according to the invention, which in this disclosure will be referred to as the "TF" configuration. In TF configuration, the wheelchair is set at one of several possible angles of tilt about a pivot axis 10 near the knees of the occupant. FIGS. 2*a* and 2*b* illustrate two alternative fixed tilt angles for the TF configuration.

Figure 4:
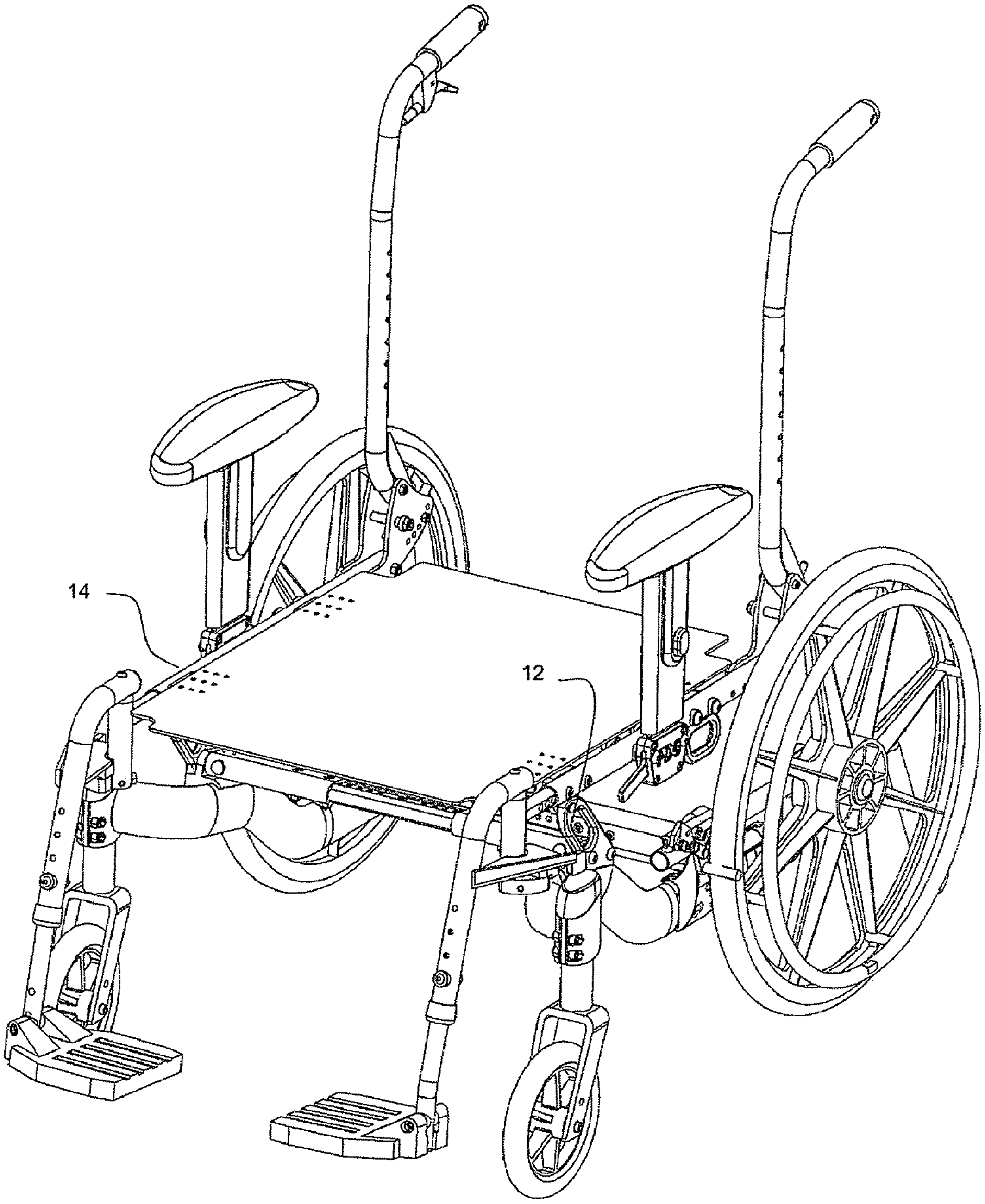
FIG. 4 is a front perspective view of the T20 configuration.
Figure 5A:
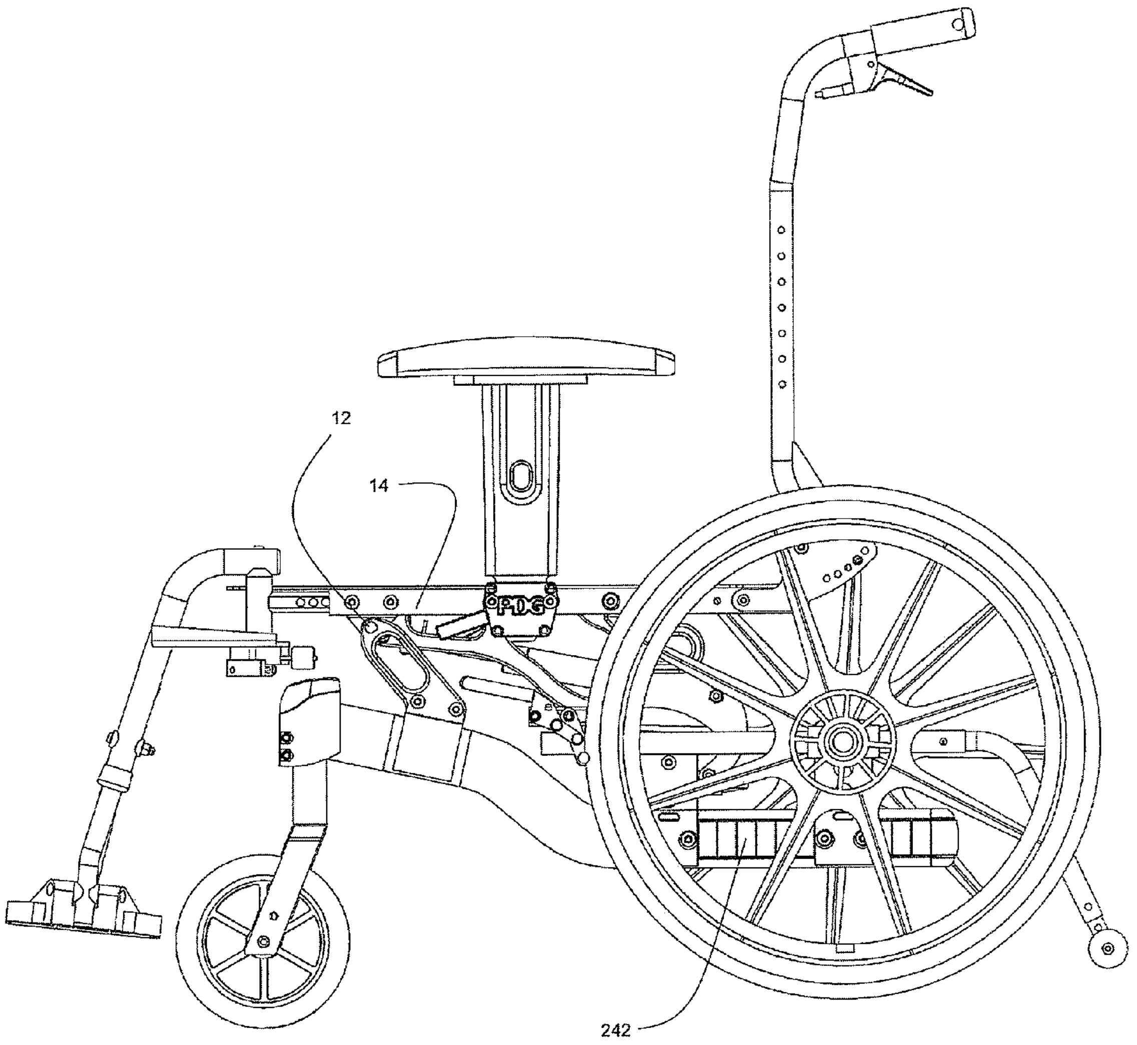
FIG. 5*a* is a side elevation of the T20 configuration at a neutral (horizontal) tilt angle.
Figure 5B:
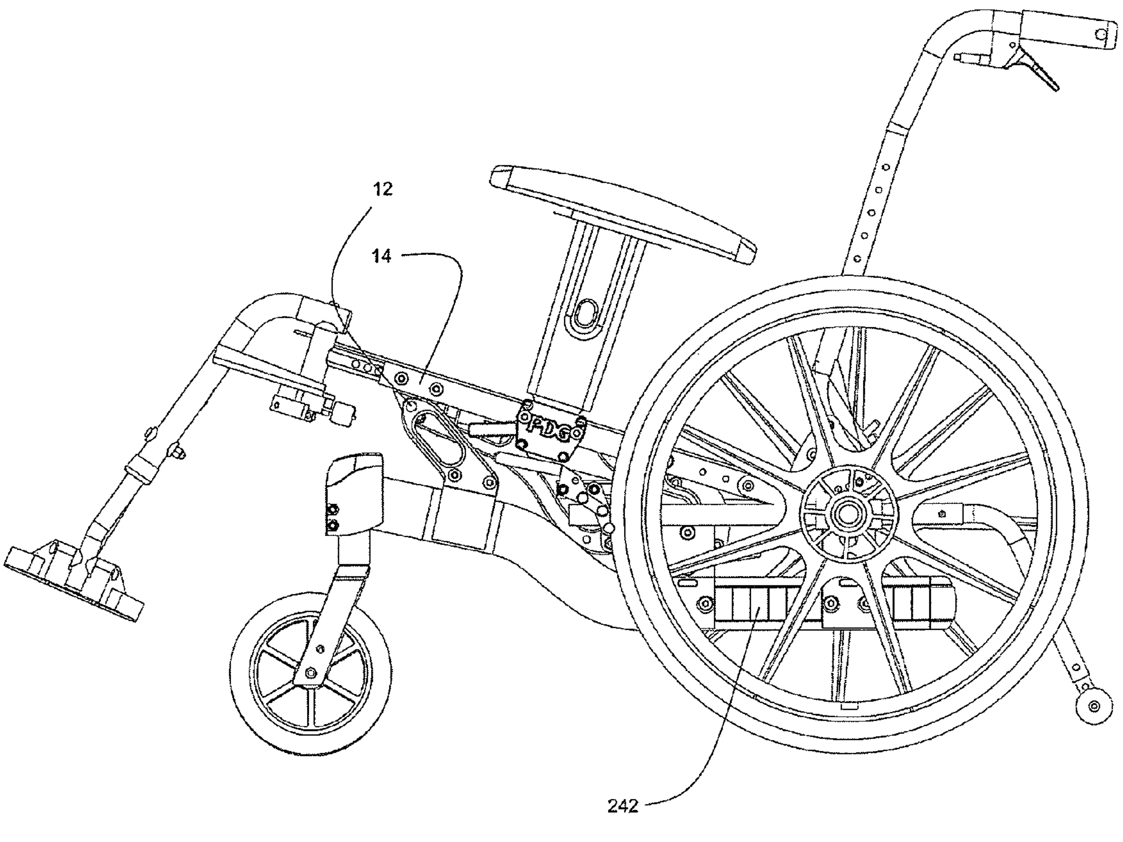
FIG. 5*b* is a side elevation of the T20 configuration at a different tilt angle than in FIG. 5*a;*

FIGS. 4, 5*a* and 5*b* illustrate the preferred embodiment of the dynamic tilt-in-space configuration of the wheelchair, in which the axis of rotation 12 is provided near the front of the seat frame assembly 14. The preferred embodiment of this configuration is designed to ensure that the front of the occupant's knees move upward only a very small amount as the chair undergoes a full range of tilt of up to 20 degrees. In this disclosure, this configuration will be referred to as the "T20" configuration. FIGS. 5*a* and 5*b* illustrate two different degrees of tilt for the T20 configuration.

Figure 6:
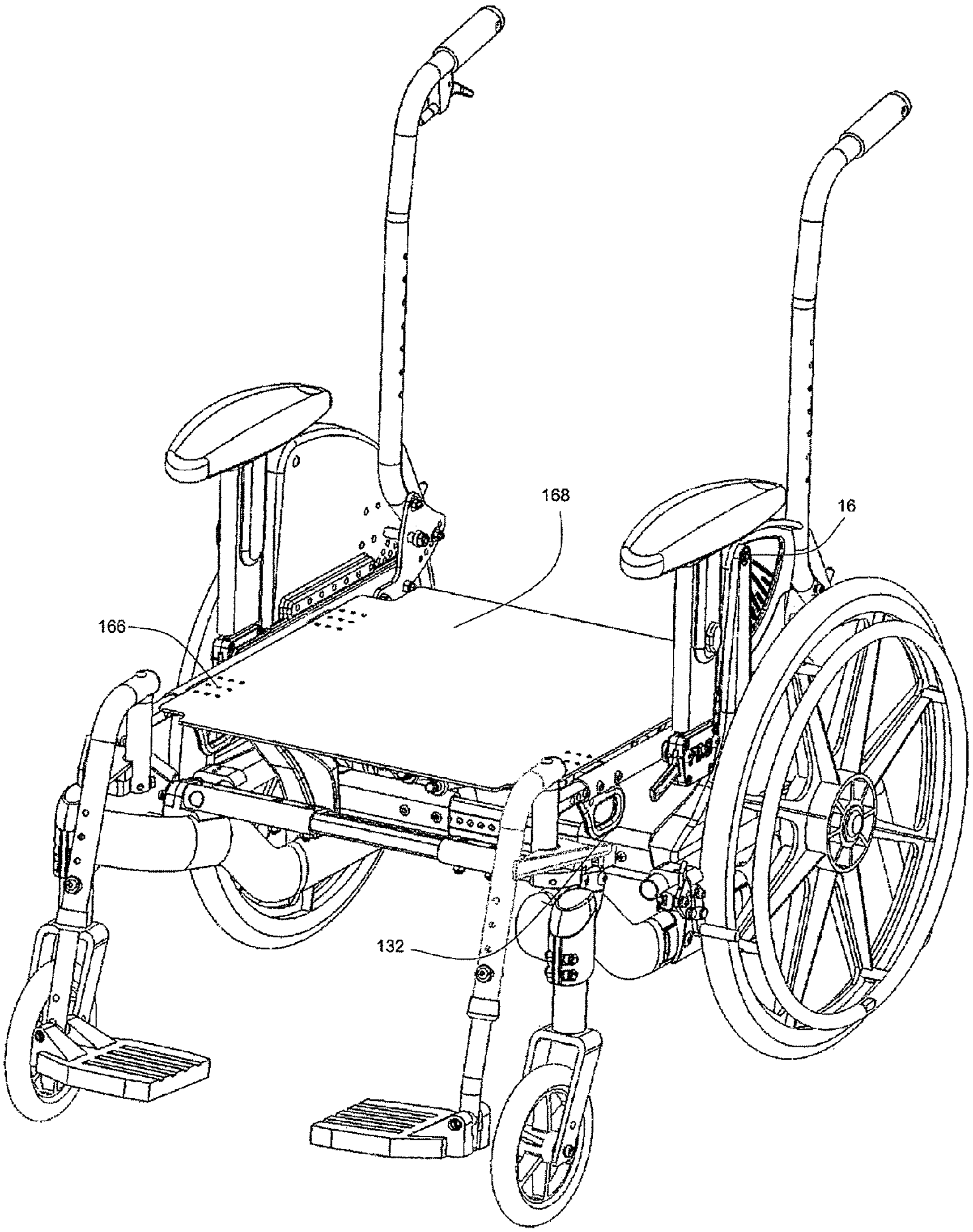
FIG. 6 is a front perspective view of the T50 configuration.
Figure 7A:
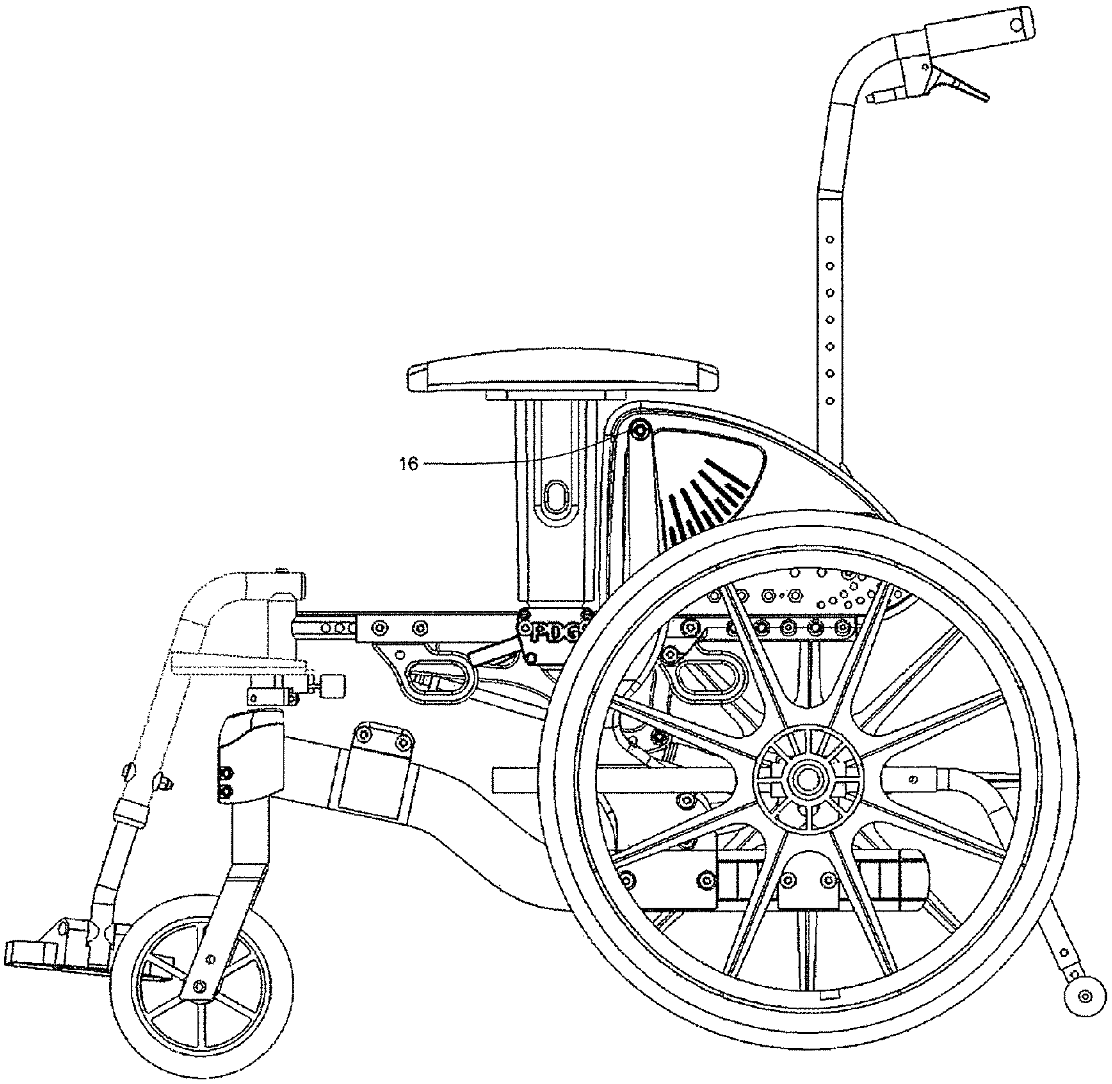
FIG. 7*a* is a side elevation of the T50 configuration at a neutral (horizontal) tilt angle.
Figure 7B:
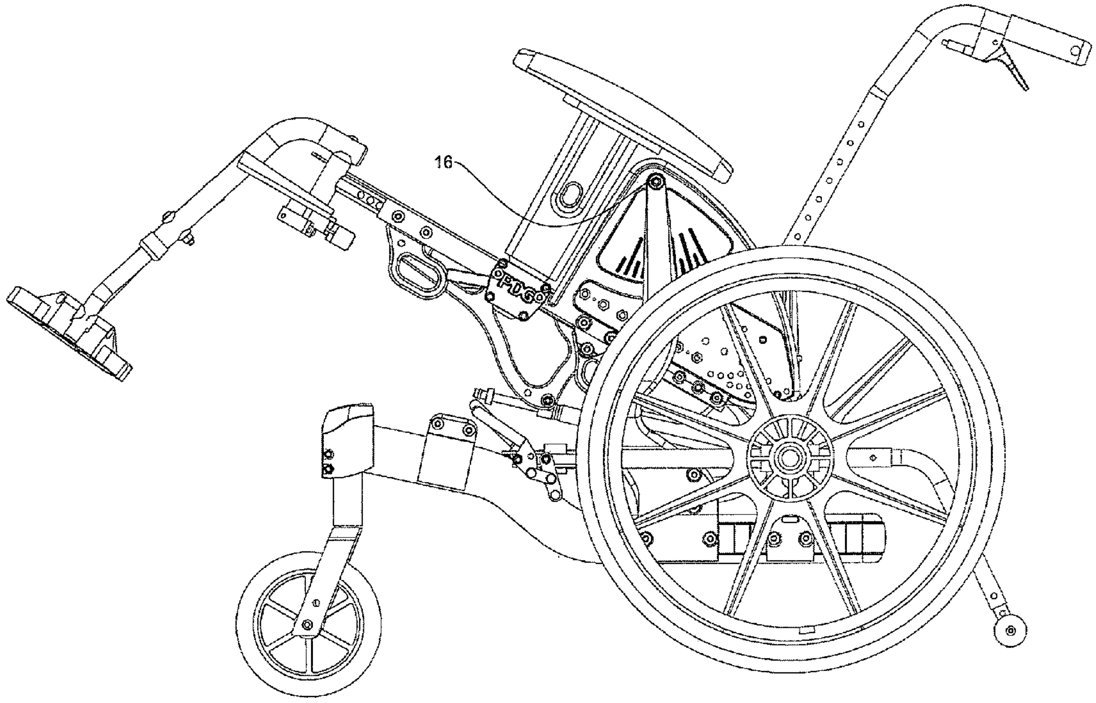
FIG. 7*b* is a side elevation of the T50 configuration at a different tilt angle than in FIG. 7*a;*

FIGS. 6, 7*a* and 7*b* illustrate the preferred embodiment of the dynamic tilt-in-space configuration of the wheelchair, in which the axis of rotation 16 is provided near the center of gravity of the occupant. The preferred embodiment of this configuration is designed for tilt angles of up to 50 degrees. In this disclosure, that configuration will be referred to as the "T50" configuration. FIGS. 7*a* and 7*b* illustrate two different degrees of tilt for the T50 configuration Each of the TF, T20 and T50 configurations is built around a set of sub-assemblies that is common to each of the configurations, and that are adapted to receive interchangeable components to modify the wheelchair to the desired configuration.

Figure 8:
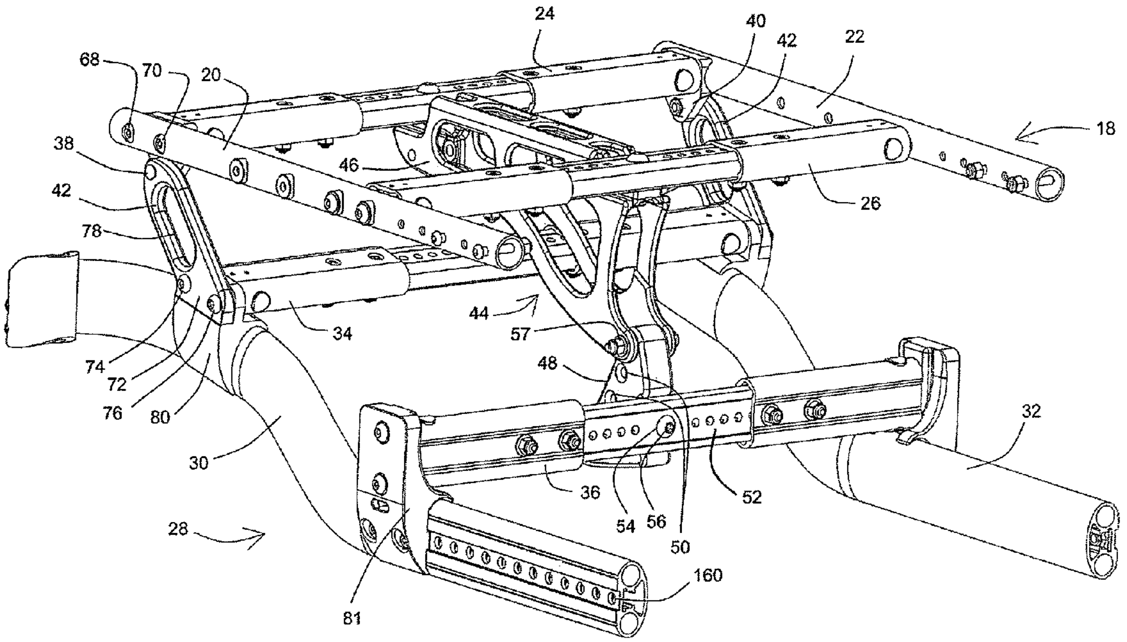
FIG. 8 is a perspective view of the base frame, seat frame, support and pivot assemblies of the TF configuration.
Figure 9:
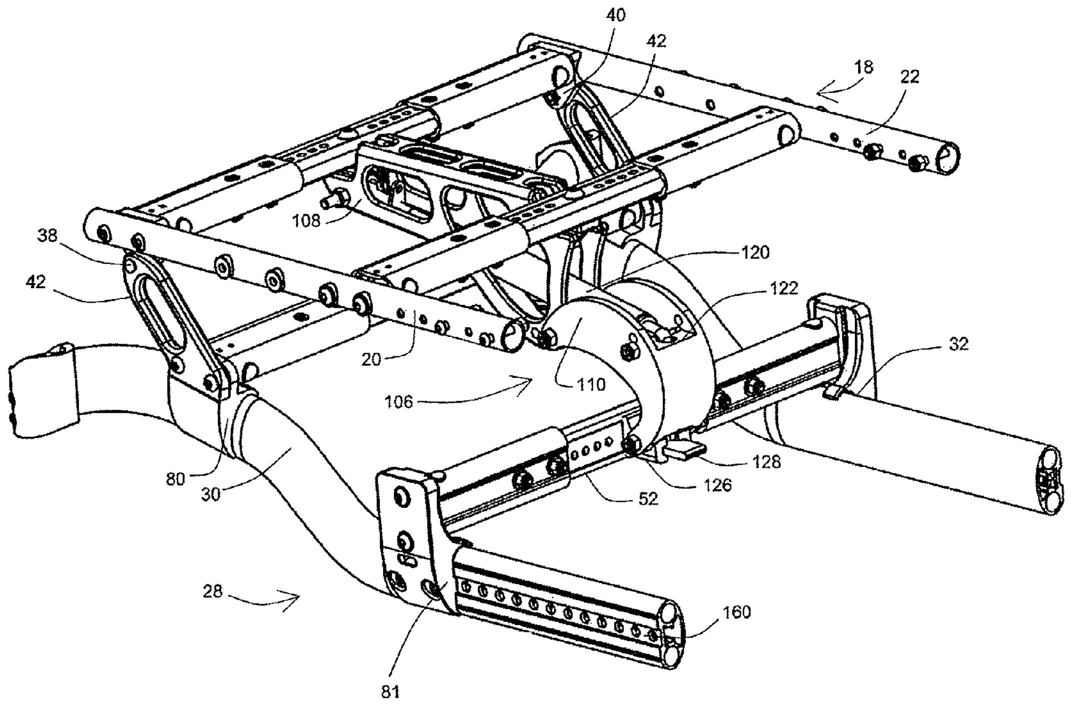
FIG. 9 is a perspective view of the base frame, seat frame, support and pivot assemblies of the T20 configuration.
Figure 10:
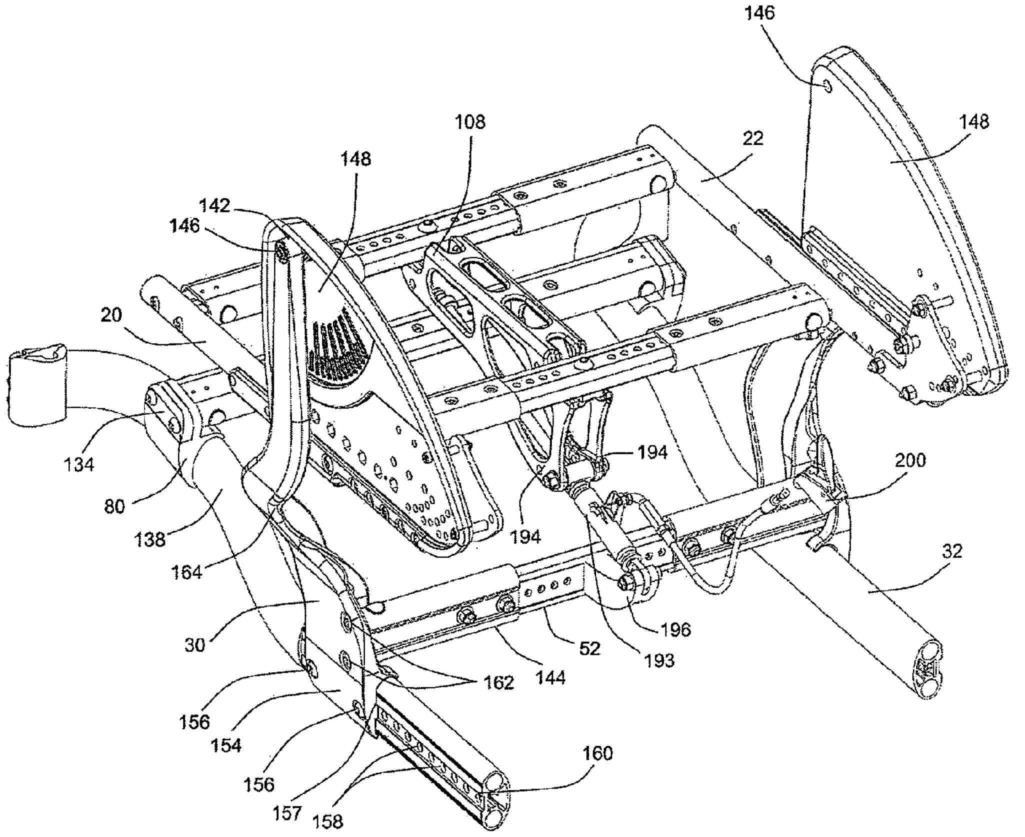
FIG. 10 is a perspective view of the base frame, seat frame, support and pivot assemblies of the T50 configuration.
Figure 10A:
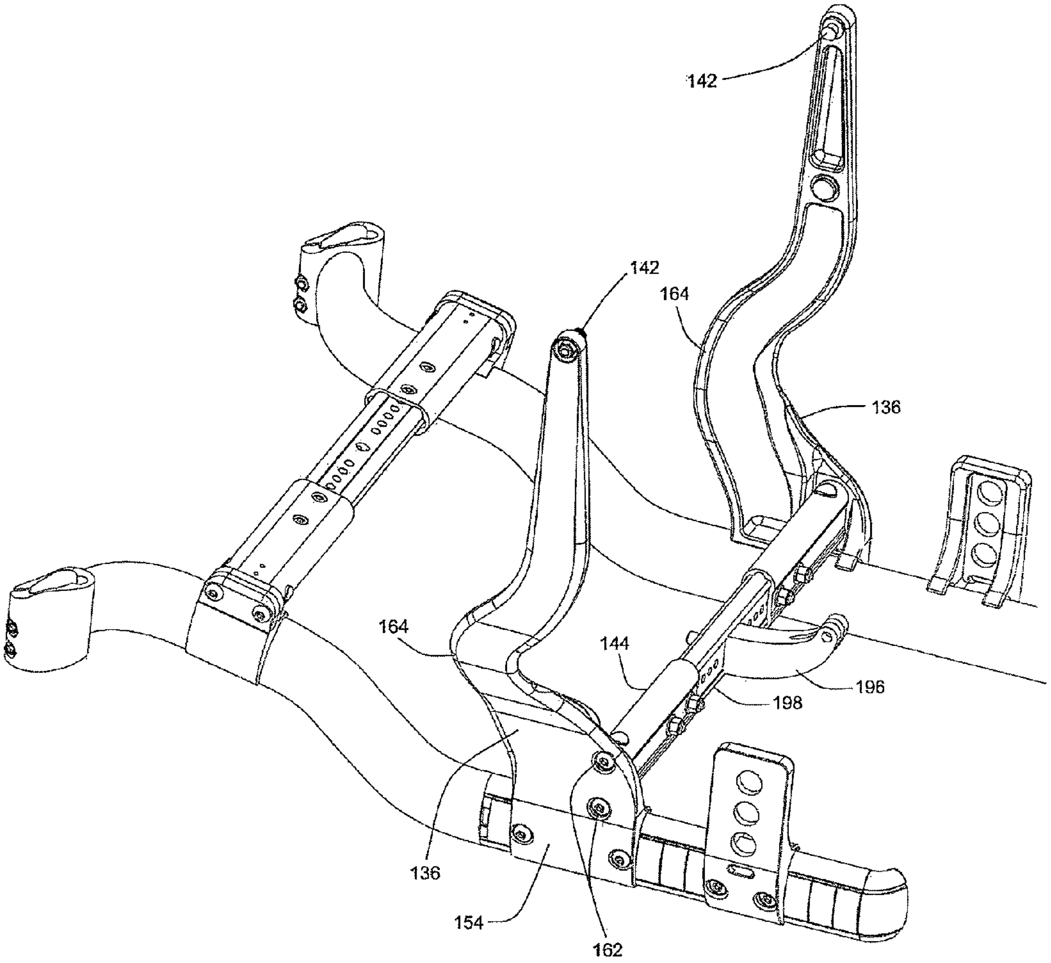
FIG. 10*a* is a top perspective view of the base frame assembly of the T50 configuration, including the pivot arms mounted thereon.
Figure 10B:
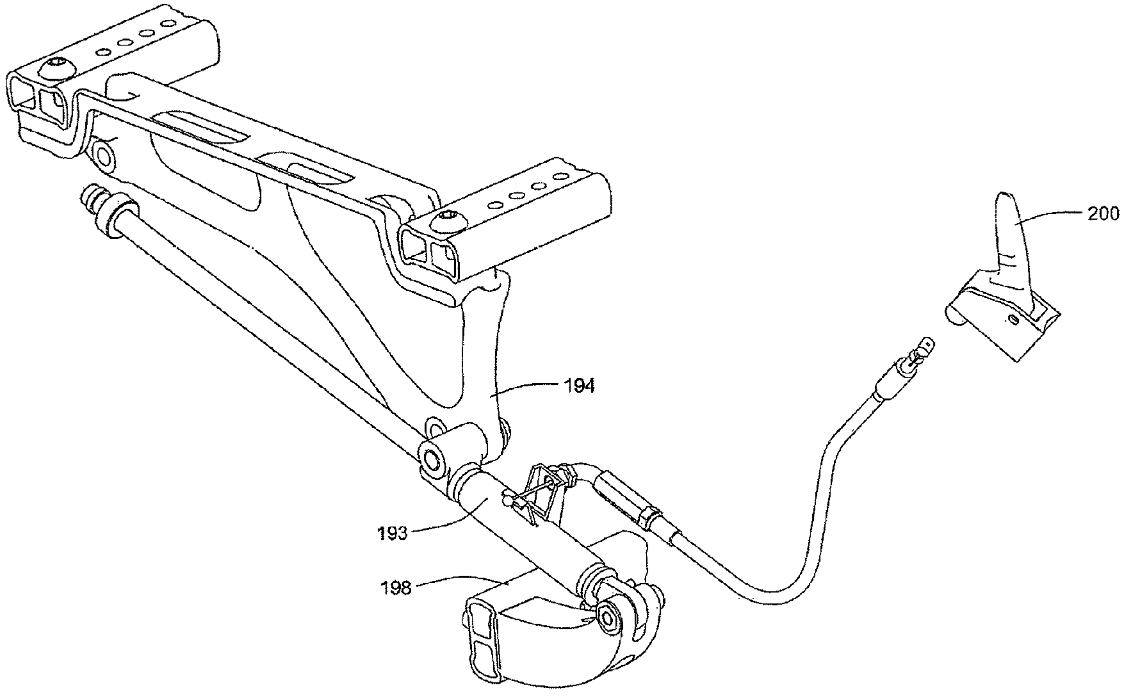
FIG. 10*b* is a partially sectioned, top perspective view of the support (lock) assembly for the T50 configuration.

The principal sub-assemblies that are modified to effect a change in the configuration of the wheelchair are the support assemblies for providing load-bearing support between the base frame assembly and the seat frame assembly (or to lock the seat frame against pivoting), and the pivot assemblies that provide a pivot connection between the base frame assembly to the seat frame assembly. FIGS. 8, 9 and 10 illustrate the base frame and seat frame assemblies for the TF, T20 and T50 configurations respectively, including their associated support and pivot assemblies.

TF Configuration

Referring to FIG. 8, a seat frame consists of an assembly 18 comprising a left and right seat rails 20, 22 joined by front and rear seat crossbar assemblies 24, 26. A base frame consists of an assembly 28 comprising left and right base rails 30, 32 joined by front and rear base crossbar assemblies 34, 36. In the TF configuration, seat frame assembly 18 is set in pivoted relation to the base frame assembly 28 about opposed pivot points (only pivot point 38 is visible in FIG. 8) located near the front of the left and right seat rails 20, 22. The pivot points are located between 1⅝ and 6⅝ inches from the forward edge of a seat pan that is secured, as intended, to the seat crossbar assemblies 24, 26. to The pivot assembly in the TF configuration generally comprises two pivot elements that cooperate to define pivot point 38 between them: pivot supports 40 and pivot hanger brackets 42.

Figure 8A:
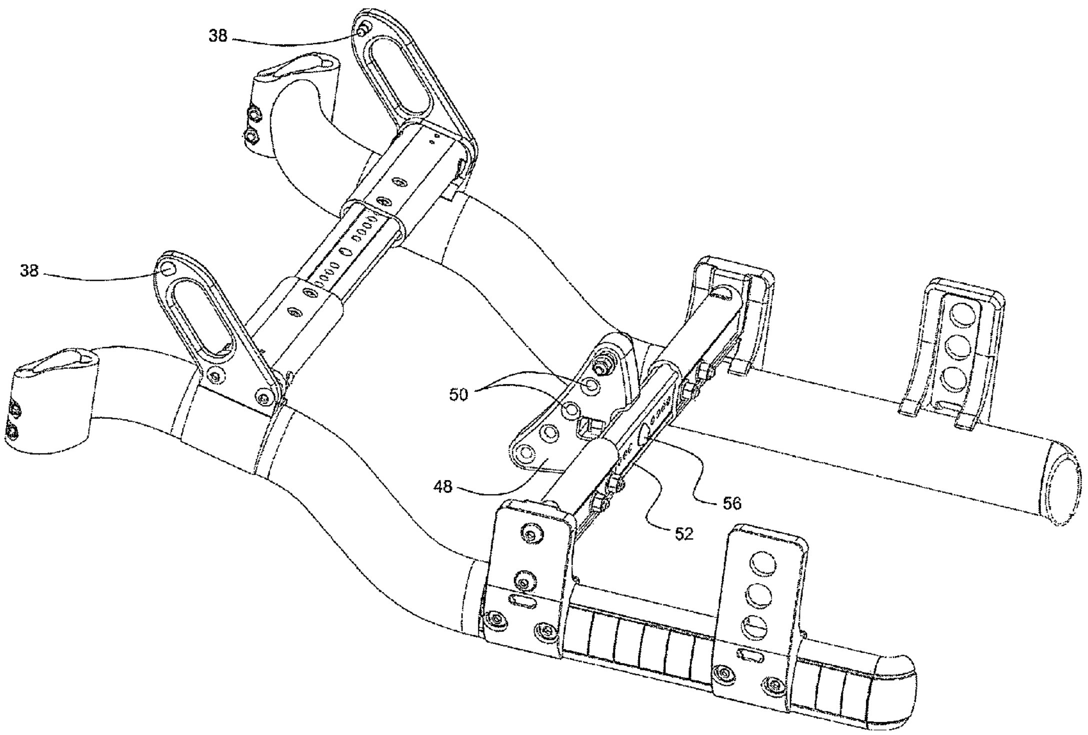
FIG. 8*a* is a perspective view of the base frame assembly of the TF configuration, with the interface mount secured to the rear base crossbar assembly.

The support assembly 44 for the TF configuration is attached between the front and rear seat crossbar assemblies 24, 26 and the rear base crossbar assembly 36. Support assembly 44 comprises brace bracket 46 and an interface mount element 48. Different degrees of relative tilt between the seat frame and base frame are achieved by connecting the lower end of brace bracket 46 to one of several attachment points 50 on interface mount 48 that is in turn removably attached to the inner tube 52 of the rear base crossbar assembly 36. The attachment points comprise apertures 50 arrayed at different angular positions along an arc of constant radius in relation to the pivot points 38. Inner tube 52 of the rear base crossbar assembly 36 includes a centrally located aperture 54 to receive a removable fastener 56 for attachment of the interface mount 48 thereto. A better view of the interface mount 48 is provided in FIG. 8*a*.

Figure 11:
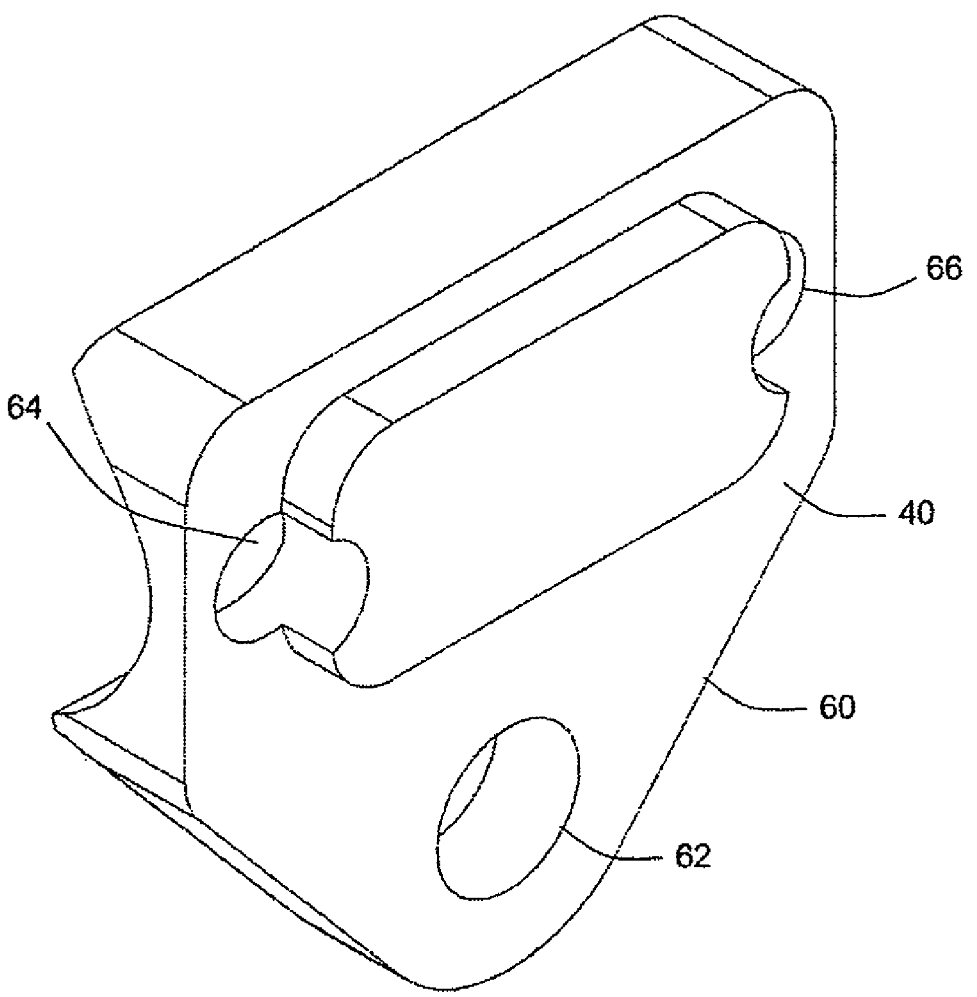
FIG. 11 is a perspective view of a pivot support.
Figure 12:
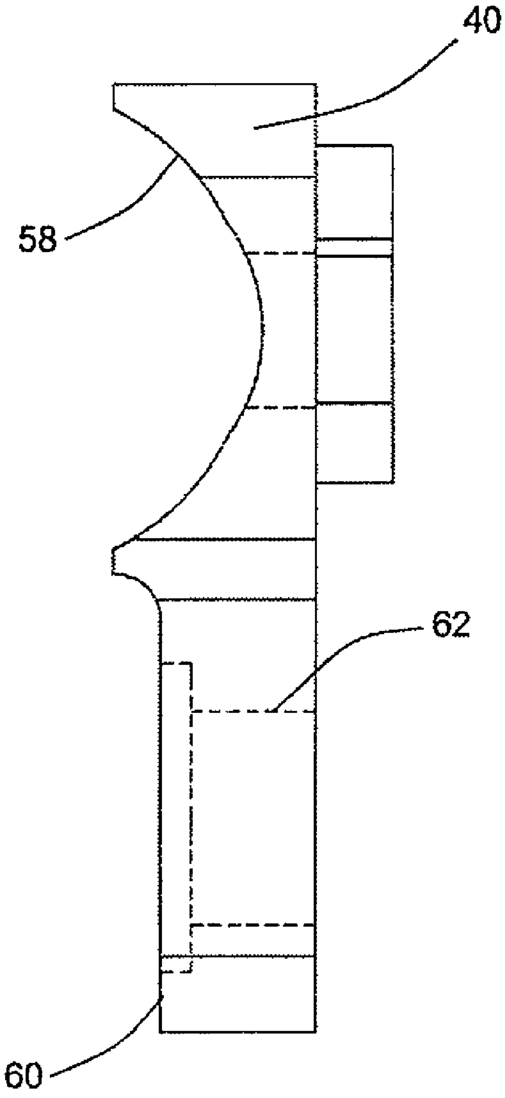
FIG. 12 is a side elevation of a pivot support.

Referring to the pivot assembly, the pivot support 40 is illustrated in detail in FIGS. 11 and 12. Pivot support 40 consists of a seating block one surface 58 of which is shaped to conform to the inside of a seat rail, and further including a downwardly extending tab 60 having an pivot pin hole 62 therethrough to receive a pivot pin. Seating block 40 includes two spaced apertures 64, 66 for receiving fasteners 68, 70 that are used to secure the front seat crossbar assembly 24 to the rail as will be discussed in more detail below.

Figure 27:
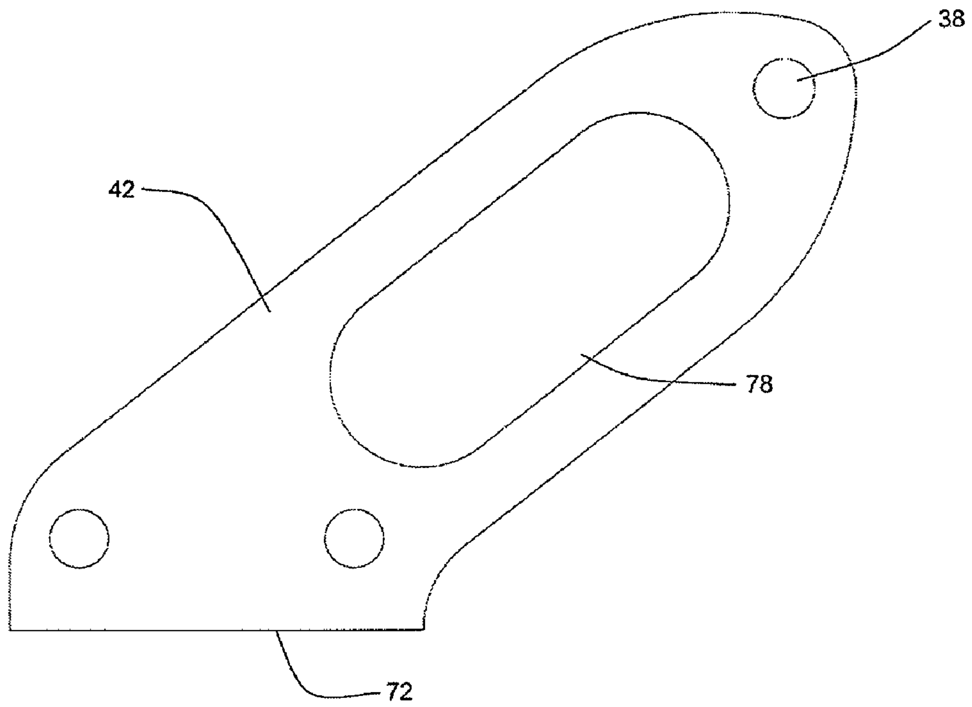

The pivot hanger bracket 42 (shown in detail in FIG. 27) similarly includes a pivot pin hole to receive a pivot pin at pivot point 38. Pivot hanger bracket 42 also has a base 72 through which extend two apertures for receiving fasteners 74, 76 used to attach the lower end of the bracket to the front base crossbar assembly 26. The pivot hanger bracket 42 is preferably provided with an oblong aperture 78 in the body thereof so as to be used as a transit tie-down bracket for optional use in securing the wheelchair to tie-down stations in vehicles. The pivot hanger bracket 42 has a portion thereof that is shaped to mate with a seat provided in a partial sleeve 80 that is welded to the front portion of each rail.

T20 Configuration

FIG. 9 illustrates the base frame, seat frame, support and pivot assemblies for the T20 configuration. As in the case of the TF configuration, the seat frame assembly 82 and the base frame assembly 84 are connected at pivot points 86 by means of pivot supports 88 mounted to the left and right seat rails 94, 96 and pivot hanger brackets 98, 100 mounted to the left and right base rails 102, 104. The pivot supports and pivot hanger brackets of the TF and T20 configurations are identical.

The T20 configuration uses a different support assembly than does the TF configuration. The T20 support assembly 106 comprises a bracket 108 (slightly different from the TF bracket 46) attached to the front and rear seat crossbar assemblies and to the rear base crossbar assembly by means of a bell crank 110 pivotally mounted to the inner tube 112 of the rear base crossbar assembly. The bell crank serves to modulate the degree of resistance provided at different tilt angles and to accommodate the change in spatial relationship between the bracket and the base frame as the seat frame is tilted.

Figure 9A:
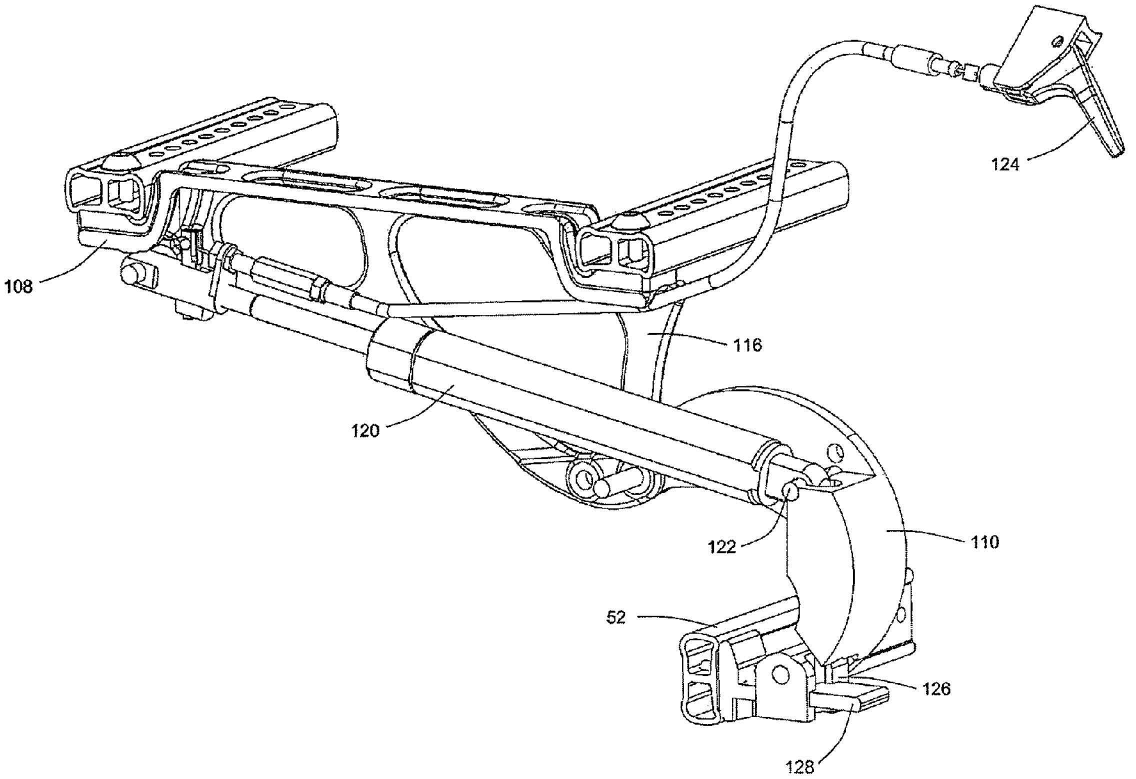
FIG. 9*a* is a partially sectioned side view of the support assembly of the T20 configuration.
Figure 13:
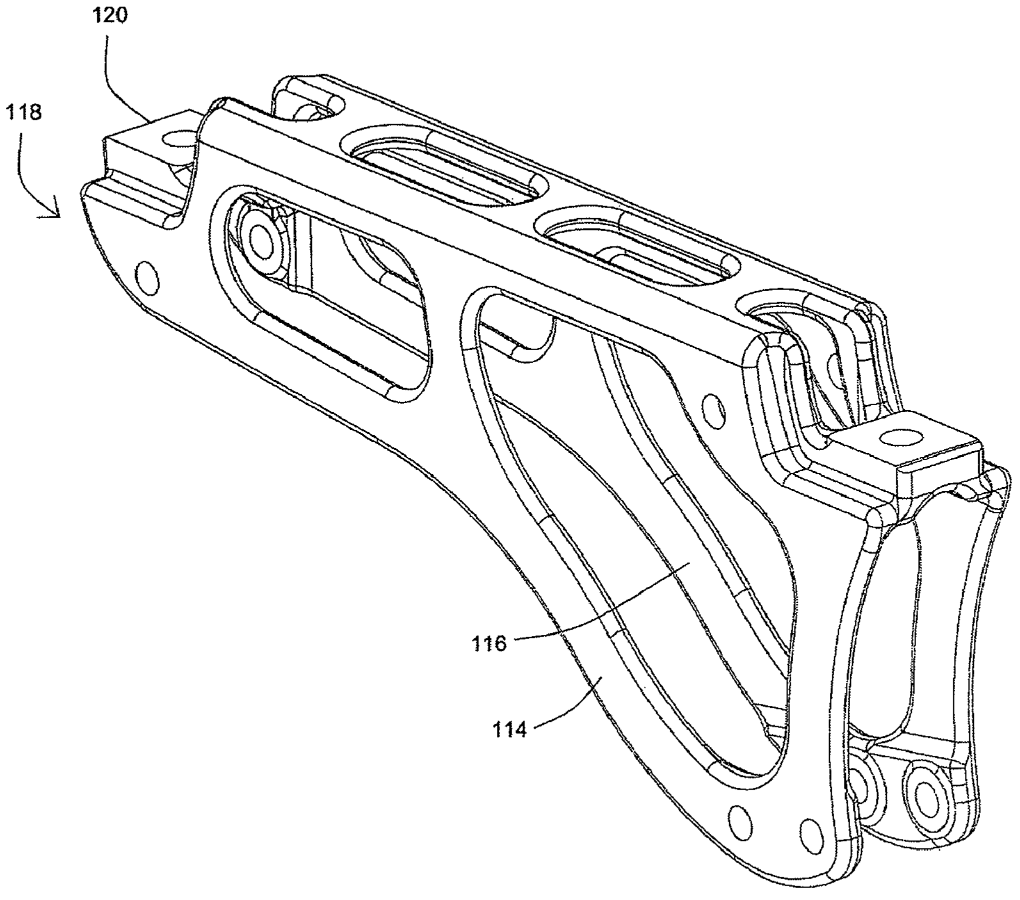
FIG. 13 is a perspective view of a bracket used in the T20 and T50 configurations.

Referring to FIGS. 9, 9*a* and 13, bracket 108 has spaced shoulders 114, 116. The front 118 of the bracket includes a bridge 120 extending between the shoulders 114, 116. Bridge 118 has a fastener aperture for attachment of one end of a gas strut.

A gas strut 120 is mounted between the shoulders of the bracket. One end of gas strut 120 is secured to bridge 118 by means of a shoulder bolt while the other end is attached to another shoulder bolt 122 extending through the medial portion of the bell crank 110. A trigger 124 is provided to control the gas strut. Because the gas strut is connected to the center of the bell crank, a pivoting of the base frame 84 in relation to the seat frame 82 will also cause a translation of the lower end of the bell crank in relation to the vertical plane. Such translation is accommodated by connecting the lower end of the bell crank to a slide 126 mounted on a guide tang 128 that is attached to the inner tube 112 of the rear base crossbar assembly by means of a fastener threaded through a suitable aperture in the inner tube 112.

T50 Configuration

FIG. 10 illustrates the base frame, seat frame, support (lock) and pivot assemblies for the T50 configuration. In the T50 configuration, the forward pivot point that was a feature of the TF and T20 configurations is not present and the pivot hanger brackets are not used in the T50 configuration. The pivot supports on the seat rails may be replaced by transit tie-down brackets 132 (see FIG. 15) according to whether the wheelchair is intended to be attachable to tie-downs on public and private transit vehicles. The transit tie-down brackets also double as crossbar mounting elements. The pivot hanger brackets that would normally be seated in partial sleeve 80 on the base rails are replaced by filler blocks 134.

The pivot assembly for the T50 configuration comprises a pivot arm 136 extending up from each of left and right base rails 138, 140 to a height 142 above the seat pan. In the preferred embodiment, apart from being secured to the rails, each pivot arm is also braced by attachment to the rear base crossbar assembly 144. The seat frame assembly is supported about pivot pins 146 at the upper end of the pivot arms by means of opposed pivot hanger plates 148 that are attached to the left and right seat rails 150, 152 and that are pivotally suspended from the pivot pins 146.

Figure 15:
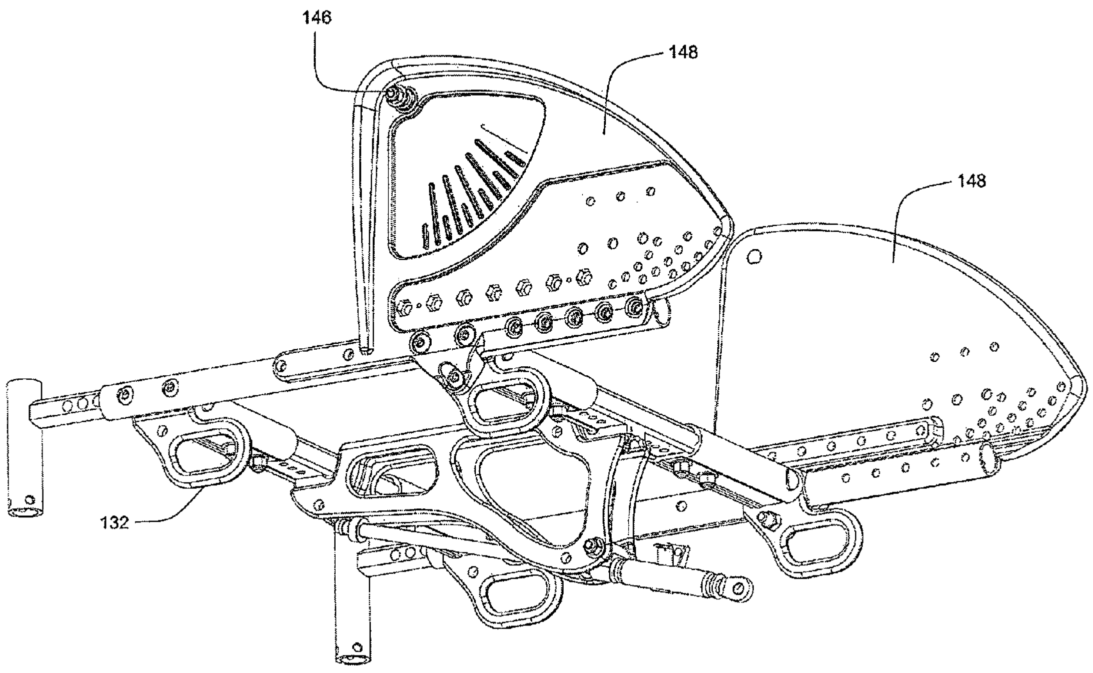
FIG. 15 is a bottom perspective view of the seat frame, pivot and support assemblies for the T50 configuration, using transit tie-down brackets.

The pivot arm 148 comprises a base 154 having a surface conforming to the rear of the base rail (see FIG. 15). Apertures 156 are provided in the base 154 to enable the base to be secured by fasteners to selected apertures 158 in a longitudinal recess 160 formed in the rear portion of the base rails. Vertically spaced apertures 162 are adapted to secure the pivot arm 136 to the rear base crossbar assembly 144. In the preferred embodiment, the pivot arm 148 extends generally upward to a forwardly extending elbow 164 to avoid interfering with the hardware used to secure the seat frame, then upwards to the pivot point 142.

Pivot pin 146 extends through the pivot arm 136 and through the pivot aperture of the pivot hanger plate 148.

The height of the pivot point 142 is selected by reference to the expected center of gravity of the occupant, as calculated using publicly available anatomical data. In the preferred embodiment, the height of this point is about 6.75 inches (171.4 mm) above the seat pan. Such height has been selected by accounting for a typical seat cushion of about 2" in thickness and an anatomically typical occupant.

The precise location in the horizontal plane of the center of gravity of a occupant tends to vary more than does its location in the vertical plane. The invention accommodates such variation by providing means to adjust the horizontal position of the back rest and of the seat pan in the fore and aft directions. This allows the occupant or installer to optimize the coincidence of the pivot point 142 at the top of the pivot arm with the center of gravity of the occupant. A matrix of apertures 166 (see FIG. 6) is provided along the edge of the seat pan 168 allowing the seat pan to be located at different fore and aft positions in relation to the seat frame assembly. The pivot arm 136 is also adapted to be set at various horizontal positions on the base rails, for example to change the wheel base load distribution and to clear interference of the front rigging and front casters.

Figure 16:
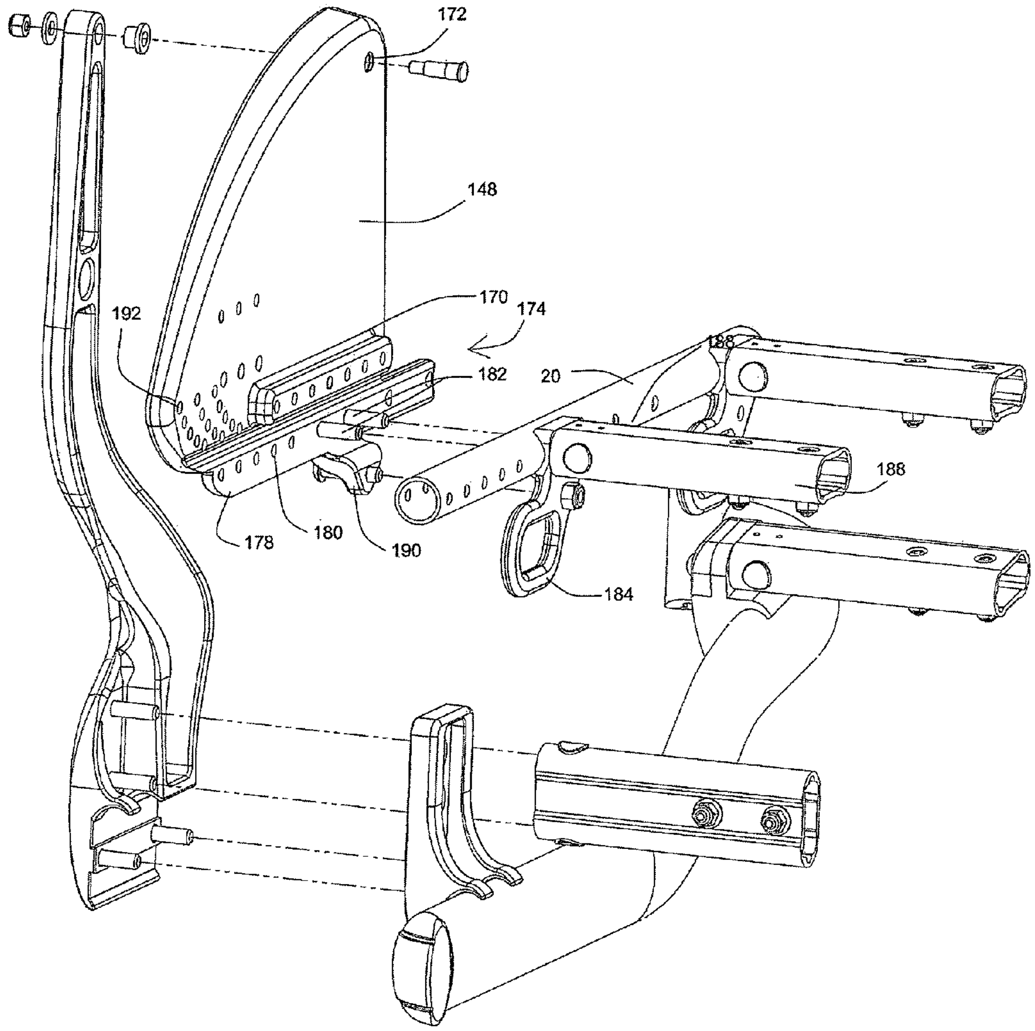
FIG. 16 is an exploded view of the pivot assembly in relation to the base and seat frame assemblies in the T50 configuration.

Referring to FIG. 16, the pivot hanger plate 148 has a broad base 170 that tapers to a pivot aperture 172 in the top of the plate forming a generally triangular shape that can also serve as a guard to prevent the occupant's clothing from coming into contact with the rear wheel. The base 170 of the pivot hanger plate includes a bottom portion 174 that conform to the top surface of the rail 176, and a downwardly extending flange 178 shaped to abut the outside of the rail. The flange 178 includes a plurality of apertures 180 the rearmost five of which are used to receive fasteners for releasably securing the back cane mounting to the pivot hanger plate 148 and the rail 178. Two of the apertures are to receive fasteners extending through the hanger plate 148, the rail 176, the transit tie-down bracket 184 (for tansit-ready chairs only) and a threaded insert 186 (see FIG. 14) extending laterally through the sleeve tube 188 of the rear crossbar assembly. A tab 190 extends downward from the center of the flange and is securable to the transit tie-down bracket by means of a fastener.

A plurality of cane mounting apertures are provided at the rear of the pivot hanger plate including three sets of apertures 192 arranged in diverging arcs. The apertures are used to mount a back cane at various angles and positions in relation to both the rail 176 and the pivot hanger plate 148.

Referring again to FIG. 10, the preferred embodiment, the support assembly for the T50 configuration comprises the same bracket as in the T20 configuration, as well as an extendible lock rod 193 attached between the rear ends 194 of the shoulders of the bracket. The rear end of the lock rod is pivotally attached to a rod mount 196 attached to the inner tube 198 of the base crossbar assembly. A trigger 200 is provided to selectively lock the rod against retraction or extension to prevent rocking of the seat frame about the pivot points.

Crossbar Assemblies

Figure 14:
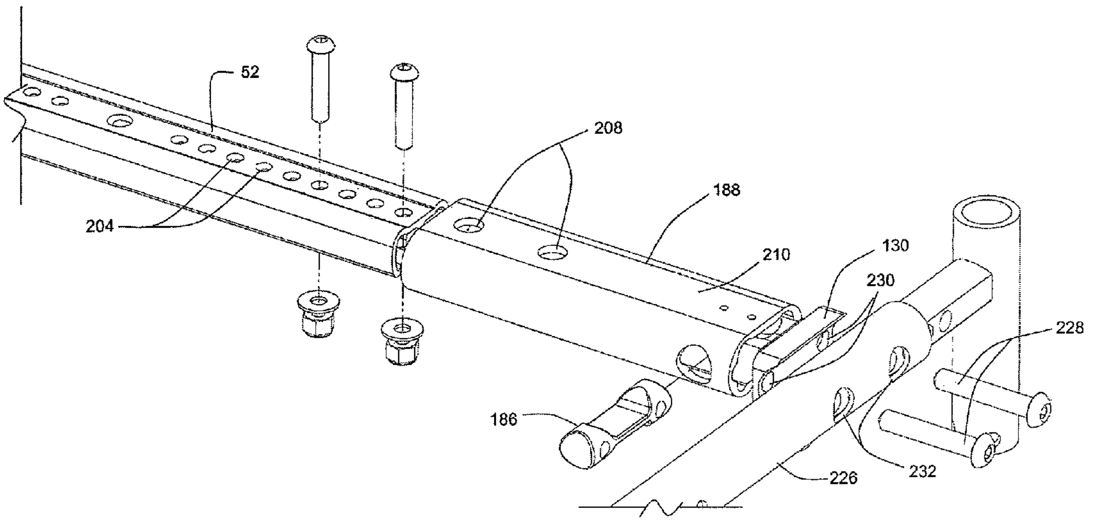
FIG. 14 is an exploded view showing the crossbar assembly and the mounting of the crossbar on a rail.
Figure 17:
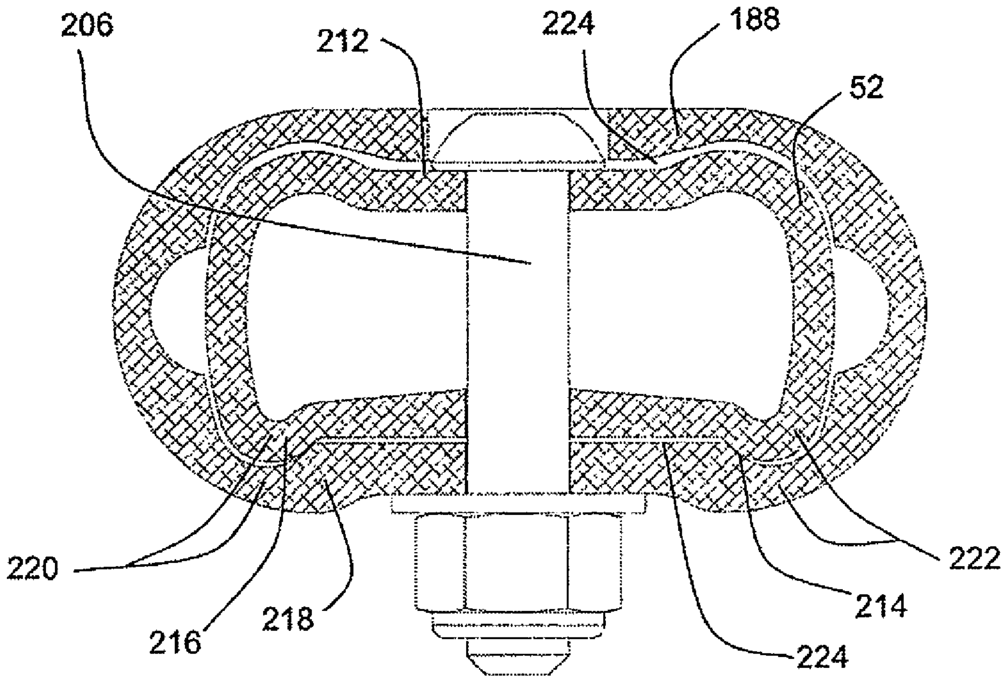
FIG. 17 is a cross-sectional view of the crossbar assembly according to the preferred embodiment.
Figure 18:
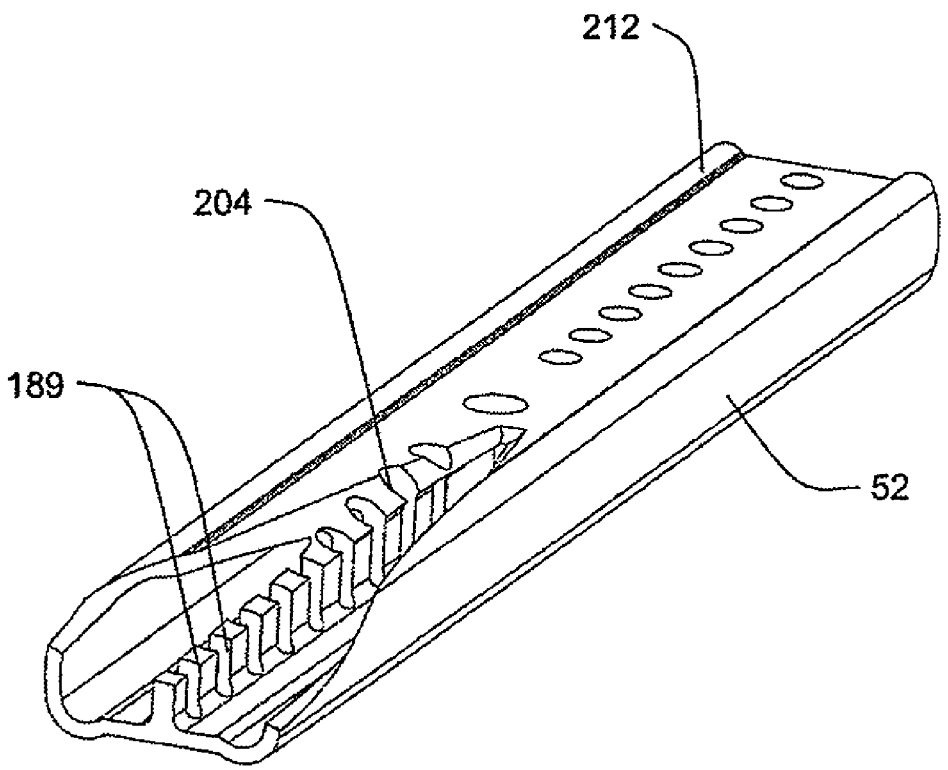
FIG. 18 is a partially sectioned view of the inner tube of the crossbar assembly.

In order to provide adjustability in the width of the wheelchair, each of the seat and base crossbar assemblies are telescope assemblies in which an inner tube 202 is received within opposed sleeve tubes 188 as may appreciated by reference to FIGS. 14 and 17. The inner and sleeve tubes have generally corresponding cross-sectional shapes and dimensions to facilitate the telescoping function.

Inner tube 202 is hollow save for a series of ribs 189 extending along the central longitudinal axis of the tube. A series of apertures 204 adapted to receive fasteners 206 are located between the ribs. The ribs provide rigidity against deformation when the inner and sleeve tubes are brought into engagement with one another by means of head screws 206 extending through selected ones of the apertures 208 and corresponding apertures in the sleeve tube.

A feature of the invention is the means by which the crossbar assemblies may be secured in a given telescoped position with a high degree of rigidity. Rather than the head of a fastener bearing on one side of the sleeve tube and a nut bearing on its opposite side, the invention provides apertures 208 in the top wall 210 of the sleeve tube 188 that are larger than the aligned apertures in the bottom wall (not visible) of the sleeve tube and that are sufficiently large that the head of the fastener bears directly on the top wall 212 of the inner tube 202. This allows the inner tube 202 to bear against the inner bottom surface 214 of the sleeve tube thereby providing a great deal of friction against relative displacement.

In addition, the inner tube shape and dimensions are selected to accommodate a small degree of elastic deformation of the inner tube to further lock the inner tube against the sleeve tube when the positioning fasteners are tightened. In the preferred embodiment, this is accomplished by providing non-flat mating bottom walls 216, 218 of the inner and sleeve tubes respectively such that any deformation of the inner tube will result in several points and angles of contact between them. In the preferred embodiment such non-flat portions comprises opposed, spaced protuberances 220, 222.

In order to accommodate the elastic deformation of the inner tube, a small dimensional gap 224 or tolerance is provided between the inner and sleeve tube contact surfaces. It will be appreciated that the extent of the gap is selected according to the elastic range of the inner tube but it should not be so large as to allow plastic deformation to occur. The telescoping joint mechanism ensures that the joint stays tight even with continuous variations in loading (fatigue). Plastic deformation of the inner tube would compromise the joint integrity and allow the joint to become loose over time.

Crossbar Mounting

Referring to FIG. 14, each seat crossbar assembly is secured to each rail by a mounting element 130 that interfaces between the rail 226 and the sleeve tube 188 of the crossbar assembly and by fasteners 228 that extend through the rail and the mounting element 130 to engage an insert 186 seated laterally through the sleeve tube.

The front seat crossbar mounting elements for all configurations are the pivot supports 40. One side of each mounting element conforms to the inside of a rail 226, and the opposite side is shaped to engage the outer end of the sleeve tube 188. Two apertures 230 are provided in the mounting element and are spaced to correspond to the spacing of two mounting holes 232 in the rail so that fasteners 228 may be received through the rail and through the mounting element. The fasteners engage insert 186 that extends laterally through the hollow inside of the sleeve tube.

Figure 19:
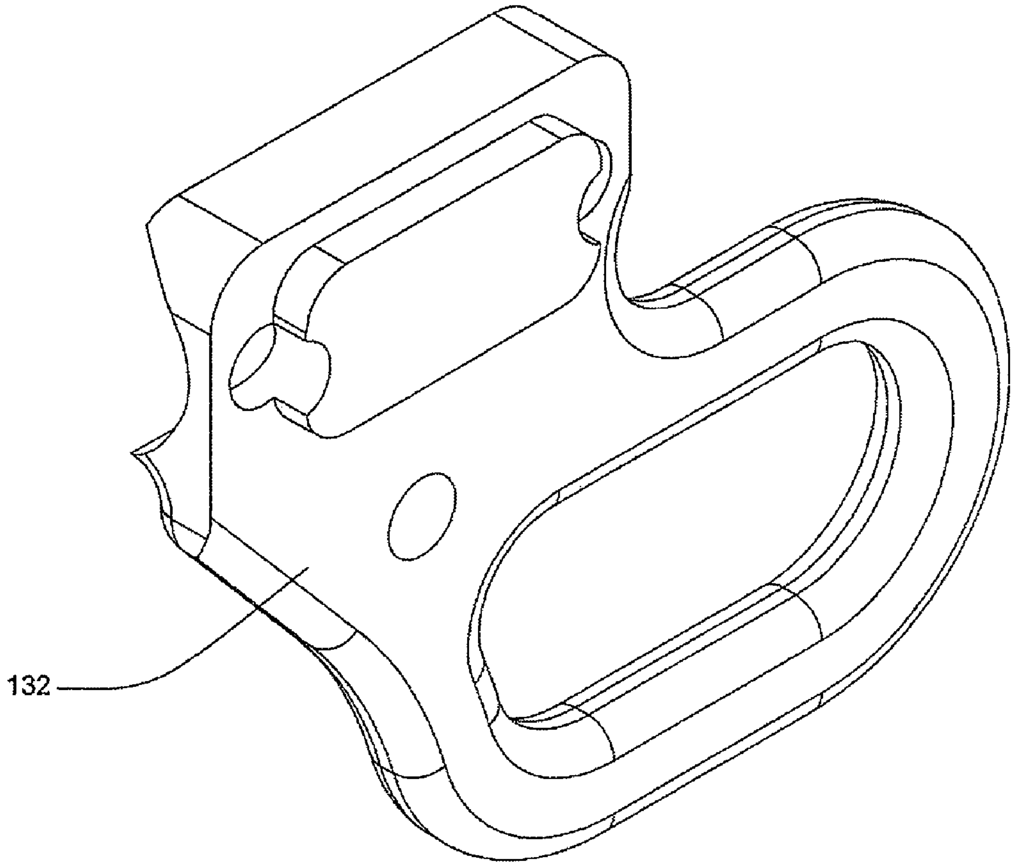
FIG. 19 is a perspective view of a transit tie-down bracket.
Figure 20:
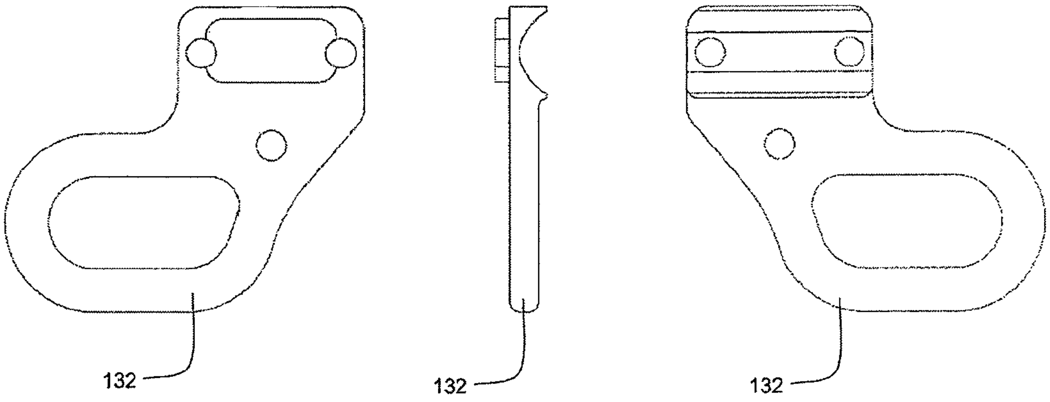
FIG. 20 is side and end elevations of the transit tie-down bracket.

The mounting elements for the rear seat crossbar assemblies for all configurations consist of either a simple mounting element 130 as in FIG. 14 or a transit tie-down bracket 132, best illustrated in FIGS. 19 and 20 that conform on one side to the inside of the rail and are configured on the other side to engage the end of the crossbar assembly.

Figure 21:
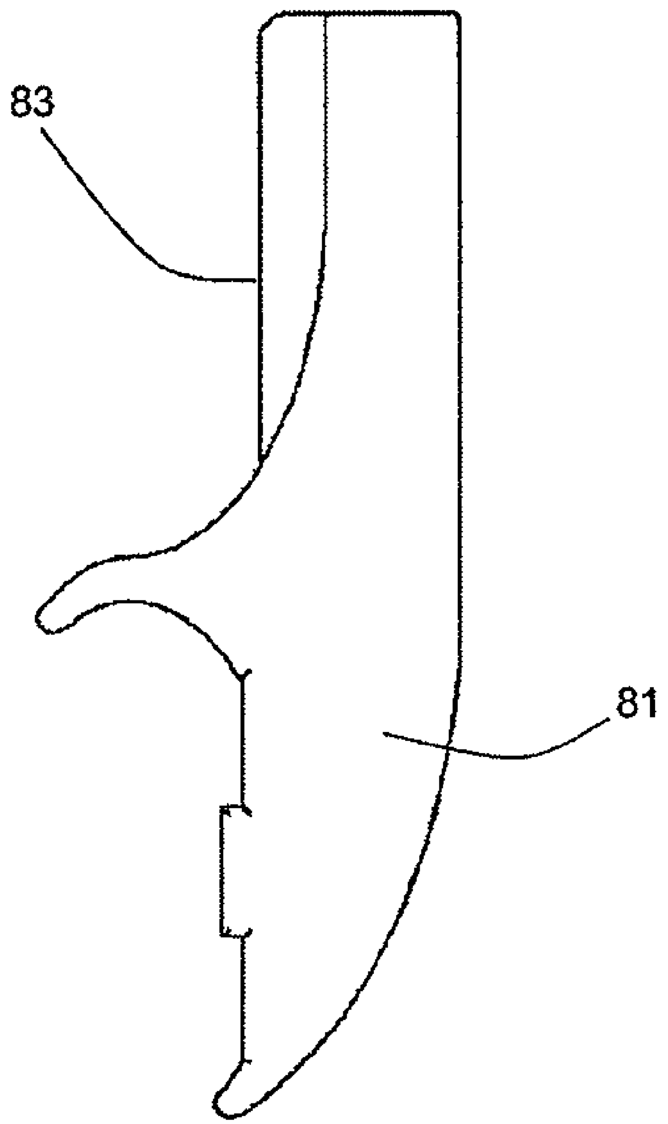
FIG. 21 is a side elevation of a rear crossbar mount.

In the case of the base crossbar assemblies, securement to the rails is by means of components that conform to a part of the rail and that include a seat to receive and secure the end of the crossbar assembly by means of fasteners. In the case of the TF and T20 configurations, the front base crossbar assembly is seated in and against partial sleeve 80 and the rear base crossbar assembly is seated in and against rear crossbar mount 81. Rear crossbar mount 81 is shaped to conform to the outside and top of the rear portion of the rail, including recess 160. Rear crossbar mount 81 also has a flat surface 83 for receiving and securing the end of the crossbar o assembly, as seen in FIG. 21. The rear base crossbar assembly is oriented such that its transverse breadth lies in the vertical plane. This allows attachment of the interface mount 48, the slider assembly 126, 128 or the mechlok rod mount 196 (as the case may be) to be attached to the inner tube by a fastener through an aperture traversing the width of the inner tube.

In the case of the T50 configuration, the front base crossbar assembly is seated against a seat in a forward crossbar mount 80 that conforms to part of the front of the base rail and that has a seat adapted to receive and secure the end of the crossbar assembly.

The rear base crossbar assembly of the T50 configuration is seated in a seat provided on the inside of the base of the pivot arm 136 and is secured by two screws 162.

Base Rail Mounting System

Figure 22:
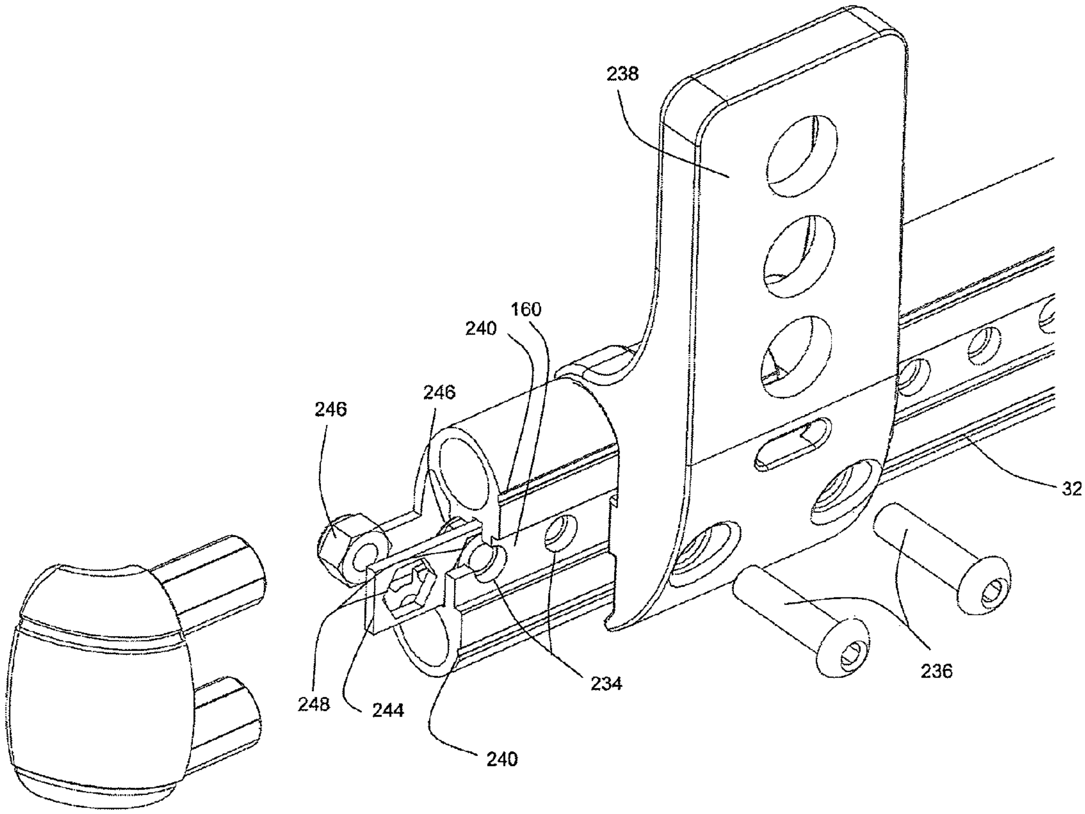
FIG. 22 is a partially exploded view of rear base rail mounting system.

The invention provides adjustability of the wheel base as well as the location of the pivot point in the horizontal plane for the T50 configuration by a longitudinal recess 160 journaled in the rear portion of each base rail 233. Referring to FIG. 22, a plurality of aligned apertures 234 along the interior of the recess receive fasteners 236 that are used to secure the rear (drive) wheel axle mounting plate 238, crossbar mounts or the base of the pivot arms as the case may be. The relative front to back position of those components can be adjusted by selecting the appropriate apertures. The edges of the channel include grooves 240 adapted to receive clip-on masking caps 242 (see for example FIG. 5*a*) to provide an aesthetic cover for those portions of the channel that are not otherwise covered by one of the foregoing components.

A mounting assembly is provided for securing the fasteners within the hollow interior of the rail. An elongated rod 244 is adapted to be longitudinally inserted and retained in the hollow rail 233. A plurality of nuts 246 are retained in several spaced seats 248 provided along the length of the rod such that when it is inserted and retained in the rail with the nuts aligned to the fastener apertures 234, fasteners 236 inserted into the apertures will engage the nuts and be retained without the need to traverse the opposing wall of the rail. This arrangement also avoids potential problems that might arise from securing the fasteners directly to the rail itself. As the rail and the fasteners may be of different materials, the potential for reaction between them is reduced by the invention.

The forward ends of the rails terminate in a caster clamp for retaining a standard caster assembly. The forward ends of the seat rails terminate in a front rigging hanger with an insertion tube adapted to telescope a selected depth into the front end of the rail and a vertically oriented sleeve adapted to receive a standard footrest assembly.

Drive/Wheel Assembly

Figure 23:
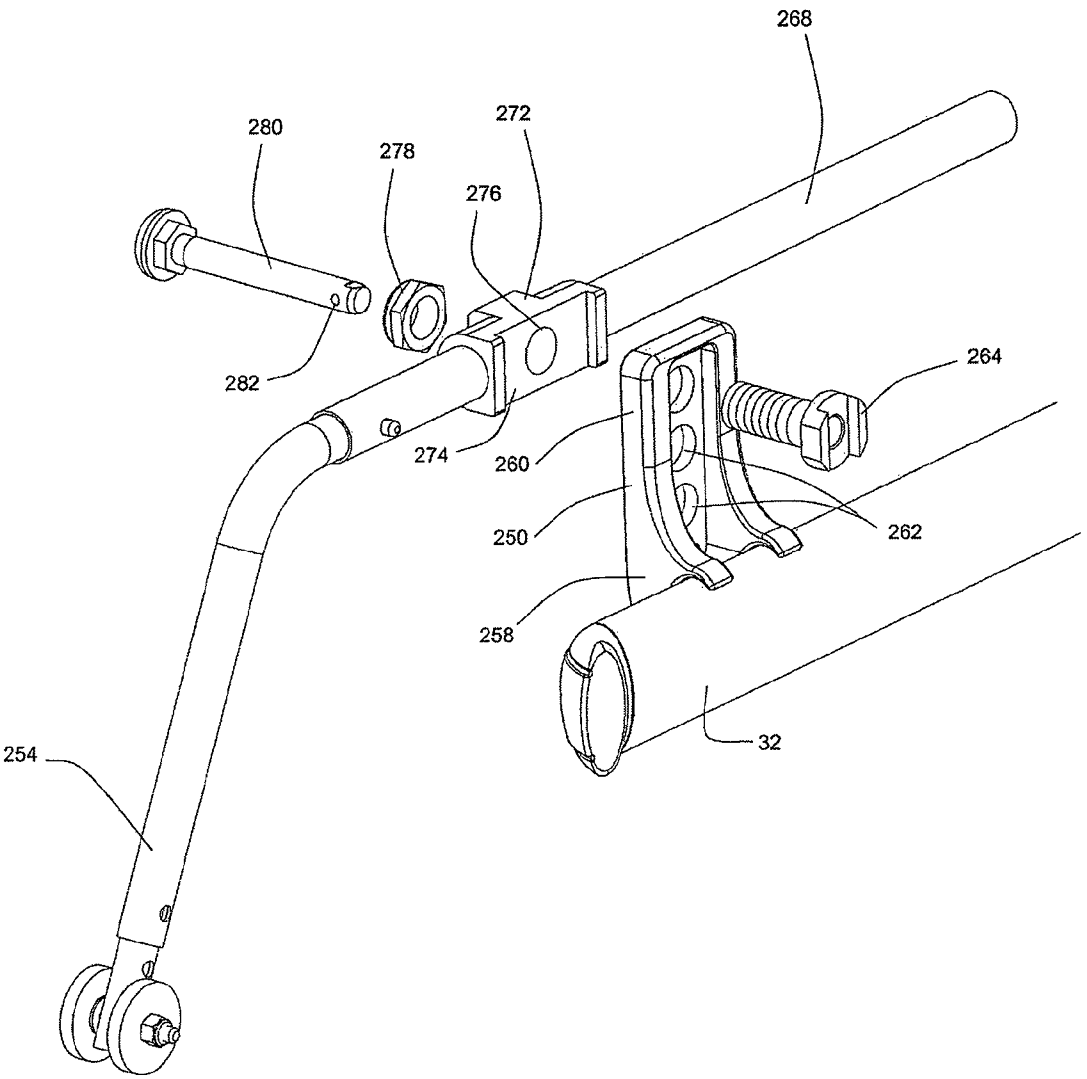
FIG. 23 is an exploded view of the rear (drive) wheel mounting assembly.
Figure 24:
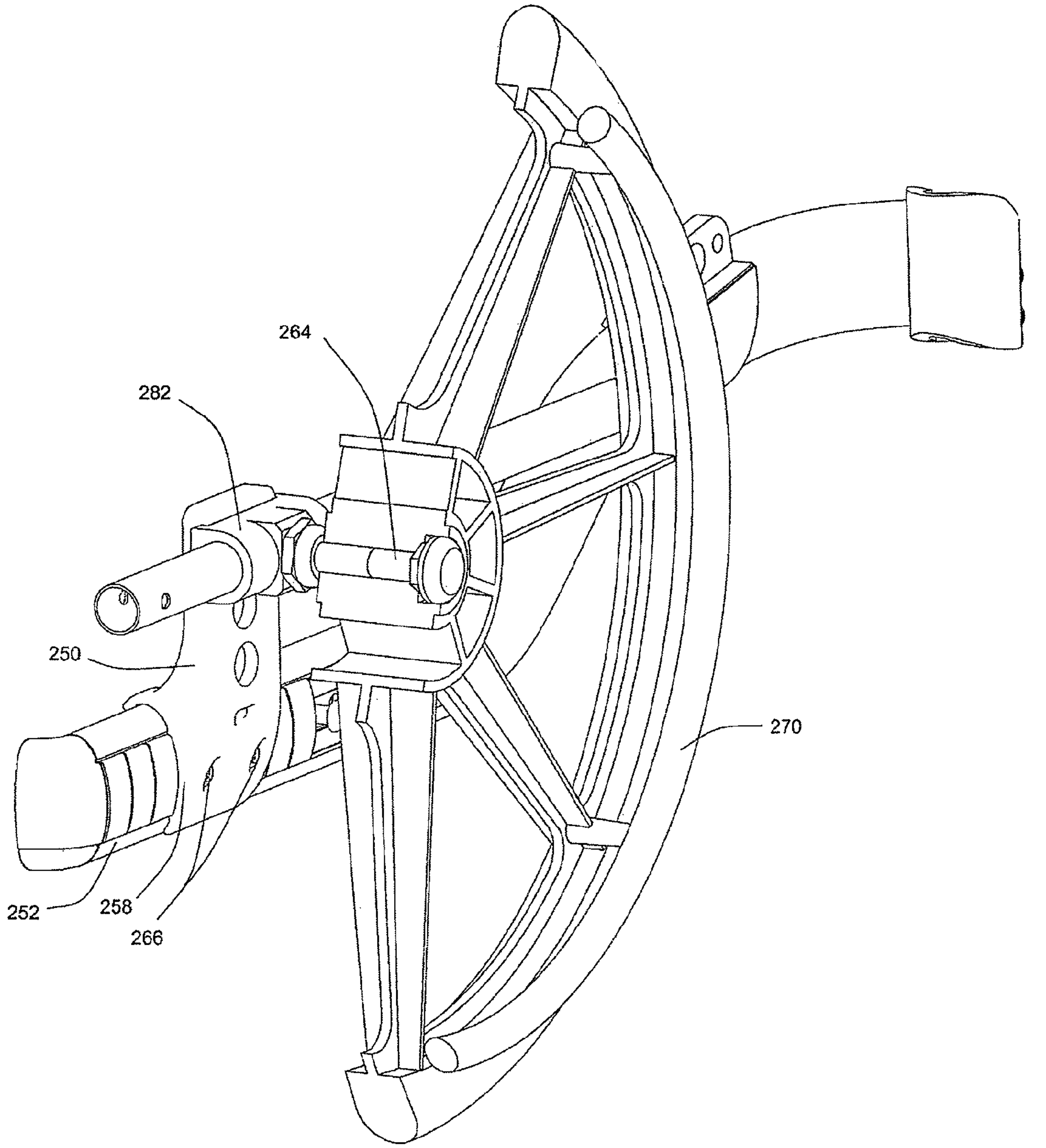
FIG. 24 is a partially sectioned view of the rear wheel mounting assembly.
Figure 25:
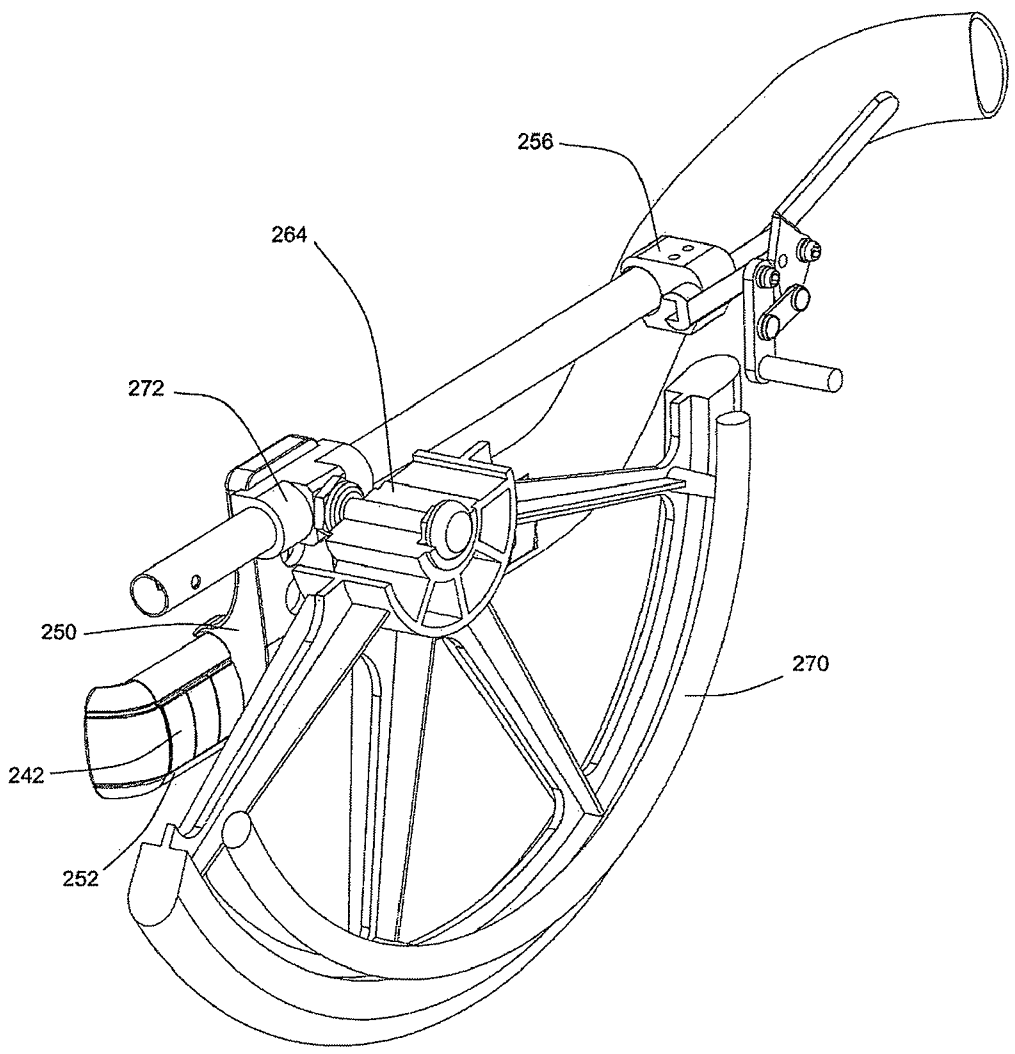
FIG. 25 is a partially sectioned view of the rear wheel mounting assembly, including the wheel lock assembly.

The rear (drive) wheel assembly is illustrated in FIGS. 23, 24 and 25. The wheel assembly includes an axle mounting plate 250 secured to the base rail 252 and means to mount each of the wheel, the wheel lock assembly and the anti-tip assembly directly onto the axle mount. This allows the position of the wheel on the frame to be adjusted by changing the location of the axle mounting plate, rather than needing to separately adjust an anti-tip assembly 254, an axle mounting plate and a wheel lock assembly 256.

The axle mounting plate 250 has a base 258 with an inner dimension corresponding to the outer shape of the rail including the recess, and an extension 260 having a plurality of aligned vertical positioning apertures 262 for receiving a rear wheel axle receiver 264 in any one of several vertical positions: The axle mounting plate 250 is secured to the rail 252 by fasteners 266 extending through apertures in the base of the axle mounting plate and through apertures provided in the recess 160.

The axle receiver 264 is inserted through a selected one of the vertically aligned apertures 262 according to the preferred ground clearance for the base frame of the wheelchair. A wheel lock tube 268 is secured between the rear wheel 270 and the axle mounting plate 250 by means of a mounting piece 272 that is adapted to provide a secure mating seat 274 for the side of the axle mount. A clearance aperture 276 through the mounting piece 272 provides a passageway for the axle receiver. The end of the axle receiver is threaded so as to receive a nut 278 used to tighten the wheel lock tube (through the mounting piece) to the axle mount. The axle 280 is inserted through the nut and the mounting piece 272 and into the hollow interior of axle receiver 264. The end of axle 280 includes retainers 282 that project out of the end of axle receiver to hold the axle therein.

Retainers 282 are biased and may be manually depressed to allow the axle to be disengaged from the axle receiver. Upon doing so, removal of the nut is all that is required in order to remove the axle receiver 264 and mounting piece 272 so as to be able to reposition the axle receiver into a different vertical positioning aperture 262.

The invention provides a simple means of repositioning the height of the rear wheel 270 in relation to the base frame with a minimum of tools and effort. In addition, since the anti-tip assembly 254 and the wheel lock assembly 256 are both mounted on the wheel lock tube 268 which in turn is mounted to the axle mounting plate, it is possible to adjust the horizontal position of the rear wheel on the base rail by repositioning the axle mount without the need to separately readjust the anti-tip assembly or the wheel lock assembly.

Back Cane Mounting

Figure 26:
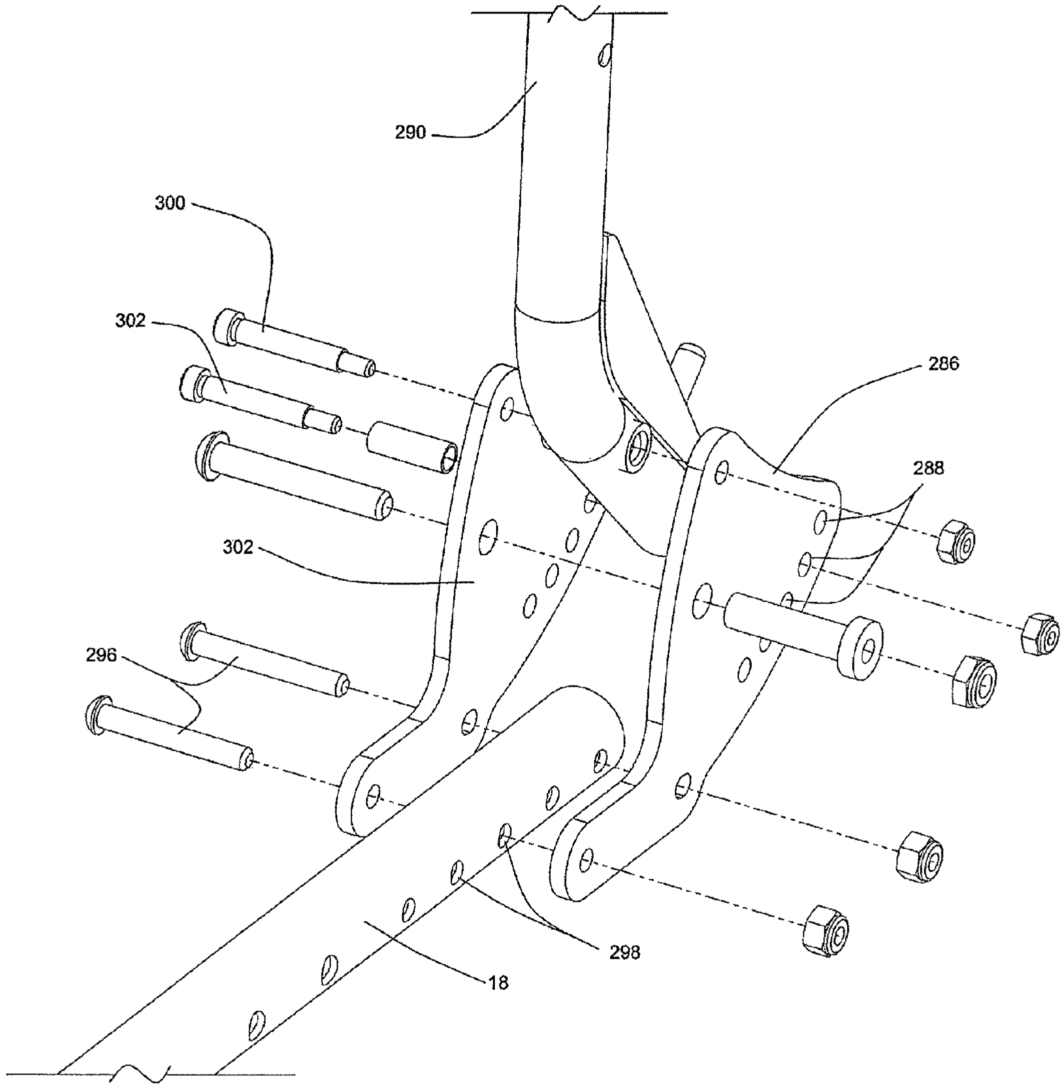
FIG. 26 is an exploded view of back cane mounting assembly for the TF and T20 configuration; and, FIG. 27 is a side elevation of a pivot hanger bracket.

A back cane assembly illustrated in FIG. 26. The assembly 284 is adapted to be mounted in various angular and fore and aft positions by providing a back plate 286 having plurality of suitable apertures to accommodate different orientations and positions of the cane 290. Back plate 286 is secured to the inside of the seat rail 294 by means of two fasteners 296 on the inside of the back cane. A number of fore and aft positions can be selected using a plurality of apertures 298 provided on the rail. The cane is then secured to the back plate by a pivot fastener 300 and by a second fastener 302 inserted through one of several apertures 288 provided in an arc about the pivot fastener 300, thereby enabling the cane to be mounted at different angles in relation to the rail.

In the TF and T20 configurations, a second back plate 302 is provided on the outside of the rail and all fasteners extend through both the inside and outside back plates. In the case of the T50 configuration, the outside back plate 302 is omitted but the pivot hanger plate 148 is provided with corresponding apertures and fulfills the same function as the outside back plate does in the TF and T20 configurations.

Converting from TF to T20 or T50

Reconfiguring a wheelchair from the TF fixed tilt configuration to a dynamically tiltable configuration (i.e. to either the T20 or the T50) is generally accomplished as follows.

The TF configuration comprises a support assembly (brace bracket 46 and interface mount element 48) connected between the seat frame assembly 18 and the base frame assembly 28. The interface mount element 48 is configurable by the selection of different attachment points 50 to define any one of a plurality of predetermined relative pivot angles between the seat frame and the base frame. The interface mount element 48 is first removed by removing fasteners 56 and 57. A bias mechanism is then installed to provide a mechanical advantage in tilting the seat frame in relation to the base frame, thereby providing a dynamically tiltable wheelchair. In the case of the T20, the bias mechanism is the assembly consisting of gas strut 120, bell crank 110 and slide 126. One end of gas strut 120 is secured to bell crank 110. The other end of the gas strut is secured to the seat frame, or more particularly to a bracket 108 that is associated with the seat frame. Bell crank 110 is secured (through slide 126 and guide tang 128) to the same attachment point that received fastener 56 in the TF configuration. In the case of the T50m the bias mechanism is a mech lok.

Converting from T20 to T50

The conversion to the T20 to the T50 configuration involves both a change of the pivot assembly and of the support assembly.

In the T20, the pivot assembly consists of cooperating pivot elements, namely pivot supports 88 and pivot hanger brackets 98, 100, each of which is removably attached to the chair by fasteners 68, 70 or fasteners 74,76. The pivot assembly of the T20 is removed by disengaging fasteners 68, 70, 74 and 76. A new centre of gravity pivot assembly is installed by mounting pivot arms 136 on the base rails and mounting pivot hanger plates 148 to the seat rails, and pivotally connecting the pivot arms to the hanger plates by pivot pins 146. The pivot arm is secured to the base rails by inserting fasteners in to apertures that extend to the pivot arm and in to the base rails. The hanger plates are mounted by securing fasteners to the plate and into apertures in the seat rails. If desired, a transit tie down bracket can be installed where the pivot hanger brackets would normally be attached in the T20 configuration.

The preferred embodiment of the invention has been described in some detail. However, those skilled in the art will appreciate that various modifications to the constructional details of the embodiment may be practiced without departing from the spirit and scope of the invention, which scope is properly defined by the claims that follow. The following claims are nonetheless to be considered part of the disclosure herein.

The invention claimed is:

1. A wheelchair having a seat frame assembly comprising opposed seat rails and at least one seat crossbar assembly extending between said seat rails, and a base frame assembly comprising opposed base rails and at least one base crossbar assembly extending between said base rails, characterized in that:

said wheelchair is reconfigurable to either one of a forward pivoted configuration or a rearward pivoted configuration, said forward pivoted configuration being enabled by:

a forward portion of said seat frame assembly and a forward portion of said base frame assembly being adapted to receive opposed removable pivot assemblies extending between said seat frame assembly and said base frame assembly for pivoting of said seat frame assembly in relation to said base frame assembly about a point defined by said pivot assemblies when said pivot assemblies are installed; and, said pivot assemblies comprising a pivot member and a forward portion of each of said seat rails being adapted to selectively attach a pivot member thereto, each pivot member interposable between said forward portion of each of said seat rails and an end of said seat crossbar assembly;

said seat crossbar assembly and said base crossbar assembly being adapted to removably receive a support assembly extending between them; and said rearward pivoted configuration being enabled by:

a rearward portion of each of said base rails being adapted to receive a removable pivot arm thereon for supporting and pivoting said seat frame assembly when said pivot arm is installed in lieu of said pivot assemblies being installed between said forward portion of said seat frame assembly and said forward portion of said base frame assembly; and, said pivot arm having a portion having a shape that conforms to and mates with a recess in said rearward portion.

* * * * *